US012505801B2

(12) United States Patent
Im et al.

(10) Patent No.: US 12,505,801 B2
(45) Date of Patent: Dec. 23, 2025

(54) PIXEL DRIVE CIRCUIT AND DRIVING METHOD THEREFOR, AND DISPLAY DEVICE

(71) Applicant: BOE Technology Group Co., Ltd., Beijing (CN)

(72) Inventors: Yunsik Im, Beijing (CN); Shunhang Zhang, Beijing (CN); Zhenyu Zhang, Beijing (CN); Zhen Zhang, Beijing (CN); Peirou Li, Beijing (CN); Dongni Liu, Beijing (CN); Lianfu Yu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/665,611

(22) Filed: May 16, 2024

(65) Prior Publication Data

US 2024/0312411 A1 Sep. 19, 2024

Related U.S. Application Data

(63) Continuation of application No. PCT/CN2023/081830, filed on Mar. 16, 2023.

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 3/2081* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC .. G09G 3/3233; G09G 3/2007; G09G 3/2081; G09G 2300/0819; G09G 2300/0852; G09G 2300/0861; G09G 2310/08
USPC ........................................................ 345/211
See application file for complete search history.

(56) References Cited

U.S. PATENT DOCUMENTS

| | | | | |
|---|---|---|---|---|
| 2021/0201760 | A1* | 7/2021 | Wang | G09G 3/3233 |
| 2021/0225262 | A1* | 7/2021 | Liu | G09G 3/2022 |
| 2021/0407376 | A1* | 12/2021 | Yue | G09G 3/3233 |
| 2022/0059021 | A1* | 2/2022 | Xuan | G09G 3/32 |
| 2022/0139322 | A1* | 5/2022 | Wang | G09G 3/3241 345/690 |
| 2022/0215796 | A1* | 7/2022 | Zhai | G09G 3/32 |

(Continued)

*Primary Examiner* — Tom V Sheng
(74) *Attorney, Agent, or Firm* — Ling Wu; Stephen Yang; Ling and Yang Intellectual Property

(57) ABSTRACT

A pixel drive circuit is configured to drive a light emitting device to emit light, the light emitting device includes a first electrode and a second electrode, the pixel drive circuit includes a current control sub-circuit and a duration control sub-circuit; the duration control sub-circuit is configured to provide control signal to a first node under control of signals of a first scan signal line, a first reset signal line, a first light emitting signal line, control signal line, a data signal line, an initial signal line, and a first power supply line; the current control sub-circuit is configured to provide a drive current to a first electrode of a light emitting device under control of signals of a first node, a second scan signal line, a second reset signal line, a second light emitting signal line, a Data signal line, and a second power supply line.

20 Claims, 8 Drawing Sheets

(56) References Cited

U.S. PATENT DOCUMENTS

| | | | | |
|---|---|---|---|---|
| 2022/0319401 | A1* | 10/2022 | Yue | G09G 3/3233 |
| 2022/0351683 | A1* | 11/2022 | Xiao | G09G 3/3291 |
| 2023/0419902 | A1* | 12/2023 | Cheng | G09G 3/3291 |
| 2024/0242659 | A1* | 7/2024 | Xiao | G09G 3/2081 |
| 2024/0304148 | A1* | 9/2024 | Wang | G09G 3/3233 |
| 2025/0081609 | A1* | 3/2025 | Xiao | H01L 25/167 |

* cited by examiner

PIXEL DRIVE CIRCUIT AND DRIVING METHOD THEREFOR, AND DISPLAY DEVICE

CROSS-REFERENCE TO RELATED APPLICATION

The present application is a continuation of International PCT Application No. PCT/CN2023/081830, filed on Mar. 16, 2023 and entitled "Pixel Drive Circuit and Driving Method Therefor, and Display Device", which is hereby incorporated herein by reference in its entirety.

TECHNICAL FIELD

The present disclosure relates to, but is not limited to, the field of display technologies, and in particular to a pixel drive circuit, a method for driving the pixel drive circuit, and a display device.

BACKGROUND

An organic light emitting diode (OLED for short), a quantum dot light emitting diode (QLED for short), and a micro light emitting diode are active light emitting display devices and have advantages such as self-luminescence, wide viewing angle, high contrast ratio, low power consumption, very high response speed, lightness and thinness, flexibility, and low cost. With continuous development of display technologies, a flexible display device (Flexible Display) in which an OLED, QLED, or micro light emitting diode is used as a light emitting element and a Thin Film Transistor (TFT) is used for signal control has become a mainstream product in the field of display at present.

SUMMARY

The following is a summary of subject matter described in the present disclosure in detail. This summary is not intended to limit the protection scope of claims.

In a first aspect, the present disclosure provides a pixel drive circuit, the pixel drive circuit is configured to drive a light emitting device to emit light, the light emitting device includes a first electrode and a second electrode, the pixel drive circuit includes a current control sub-circuit and a duration control sub-circuit;

the duration control sub-circuit is electrically connected to a first scan signal line, a first reset signal line, a first light emitting signal line, a control signal line, a data signal line, an initial signal line, a first power supply line, and a first node respectively, and is configured to provide a control signal to the first node under control of signals of the first scan signal line, the first reset signal line, the first light emitting signal line, the control signal line, the data signal line, the initial signal line, and the first power supply line;

the current control sub-circuit is electrically connected to a second scan signal line, a third scan signal line, a second light emitting signal line, a data signal line, a second power supply line, the first node and the first electrode of the light emitting device respectively, and is configured to provide a drive current to the first electrode of the light emitting device under a control of signals of the first node, the second scan signal line, the third scan signal line, the second light emitting signal line, the data signal line, and the second power supply line;

the second electrode of the light emitting device is electrically connected to a third power supply line.

In an exemplary implementation, the duration control sub-circuit includes a first node control sub-circuit, a first drive sub-circuit, a first output control sub-circuit, and a first storage sub-circuit;

the first node control sub-circuit is electrically connected to the first scan signal line, the first reset signal line, the initial signal line, the data signal line, the first node, a second node, a third node and a fourth node respectively, and is configured to drive a signal of the second node under a control of signals of the first scan signal line and the data signal line, and to provide a signal of the initial signal line to the first node and the second node under control of a signal of the first reset signal line;

the first drive sub-circuit is electrically connected to the second node, the third node, and the fourth node respectively, and is configured to provide a drive signal to the fourth node under control of signals of the second node and the third node;

the first output control sub-circuit is electrically connected to the first light emitting signal line, the first node, the third node, the fourth node and the first power supply line respectively, and is configured to provide a signal of the first power supply line to the third node and a signal of the fourth node to the first node under control of a signal of the first light emitting signal line; and the first storage sub-circuit is electrically connected to the second node and the control signal line respectively, and is configured to store a voltage difference between signals of the second node and the control signal line.

In an exemplary implementation, the current control sub-circuit includes: a second node control sub-circuit, a second drive sub-circuit, a second output control sub-circuit, and a second storage sub-circuit;

the second node control sub-circuit is electrically connected to the second scan signal line, the third scan signal line, the data signal line, the first node, a fifth node, and a sixth node respectively, and is configured to drive a signal of the first node under control of signals of the second scan signal line, the third scan signal line, the data signal line, the fifth node and the sixth node;

the second drive sub-circuit is electrically connected to the first node, the fifth node, and the sixth node respectively, and is configured to provide a drive current to the sixth node under a control of signals of the first node and the fifth node;

the second output control sub-circuit is electrically connected to the second light emitting signal line, the second power supply line, the fifth node, the sixth node and the first electrode of the light emitting device respectively, and is configured to provide a signal of the second power supply line to the fifth node and provide a drive current to the first electrode of the light emitting device under a control of a signal of the second light emitting signal line;

the second storage sub-circuit is electrically connected to the first node, the second power supply line, and the first electrode of the light emitting device respectively, and is configured to store a voltage difference between signals of the first node and the second power supply line and a voltage difference between signals of the first node and the first electrode of the light emitting device.

In an exemplary implementation, a reset sub-circuit is further included;

the reset sub-circuit is electrically connected to a second reset signal line, the first electrode of the light emitting device, and the second electrode of the light emitting device respectively, and is configured to provide a signal of the second electrode of the light emitting device to the first electrode of the light emitting device under control of a signal of the second reset signal line.

In an exemplary implementation, the first node control sub-circuit includes: a first transistor, a second transistor, a fourth transistor, and a seventh transistor, the first drive sub-circuit includes: a third transistor, and the first output control sub-circuit includes: a fifth transistor and a sixth transistor;

a control electrode of the first transistor is electrically connected to the first reset signal line, a first electrode of the first transistor is electrically connected to the initial signal line, and a second electrode of the first transistor is electrically connected to the second node;

a control electrode of the second transistor is electrically connected to the first scan signal line, a first electrode of the second transistor is electrically connected to the second node, and a second electrode of the second transistor is electrically connected to the fourth node;

a control electrode of the third transistor is electrically connected to the second node, a first electrode of the third transistor is electrically connected to the third node, and a second electrode of the third transistor is electrically connected to the fourth node;

a control electrode of the fourth transistor is electrically connected to the first scan signal line, a first electrode of the fourth transistor is electrically connected to the data signal line, and a second electrode of the fourth transistor is electrically connected to the third node;

a control electrode of the fifth transistor is electrically connected to the first light emitting signal line, a first electrode of the fifth transistor is electrically connected to the first power supply line, and a second electrode of the fifth transistor is electrically connected to the third node;

a control electrode of the sixth transistor is electrically connected to the first light emitting signal line, a first electrode of the sixth transistor is electrically connected to the fourth node, and a second electrode of the sixth transistor is electrically connected to the first node; and a control electrode of the seventh transistor is electrically connected to the first reset signal line, a first electrode of the seventh transistor is electrically connected to the initial signal line, and a second electrode of the seventh transistor is electrically connected to the first node.

In an exemplary implementation, the first storage sub-circuit includes: a first capacitor;

a first end of the first capacitor is electrically connected to the control signal line and a second end of the first capacitor is electrically connected to the second node.

In an exemplary implementation, the second node control sub-circuit includes: an eighth transistor, a ninth transistor, and an eleventh transistor;

a control electrode of the eighth transistor is electrically connected to the third scan signal line, a first electrode of the eighth transistor is electrically connected to the first node, and a second electrode of the eighth transistor is electrically connected to the fifth node;

a control electrode of the ninth transistor is electrically connected to the second scan signal line, a first electrode of the ninth transistor is electrically connected to the first node, and a second electrode of the ninth transistor is electrically connected to the sixth node; and a control electrode of the eleventh transistor is electrically connected to the second scan signal line, a first electrode of the eleventh transistor is electrically connected to the data signal line, and a second electrode of the eleventh transistor is electrically connected to the fifth node.

In an exemplary implementation, the second drive sub-circuit includes: a tenth transistor and the second output control sub-circuit includes: a twelfth transistor and a thirteenth transistor;

a control electrode of the tenth transistor is electrically connected to the first node, a first electrode of the tenth transistor is electrically connected to the fifth node, and a second electrode of the tenth transistor is electrically connected to the sixth node;

a control electrode of the twelfth transistor is electrically connected to the second light emitting signal line, a first electrode of the twelfth transistor is electrically connected to the second power supply line, and a second electrode of the twelfth transistor is electrically connected to the fifth node; and a control electrode of the thirteenth transistor is electrically connected to the second light emitting signal line, a first electrode of the thirteenth transistor is electrically connected to the sixth node, and a second electrode of the thirteenth transistor is electrically connected to the first electrode of the light emitting device.

In an exemplary implementation, the second storage sub-circuit includes a second capacitor and a third capacitor;

a first end of the second capacitor is electrically connected to the second power supply line and a second end of the second capacitor is electrically connected to the first node; and a first end of the third capacitor is electrically connected to the first node and a second end of the third capacitor is electrically connected to the first electrode of the light emitting device.

In an exemplary implementation, the reset sub-circuit includes: a fourteenth transistor;

a control electrode of the fourteenth transistor is electrically connected to the second reset signal line, a first electrode of the fourteenth transistor is electrically connected to the first electrode of the light emitting device, and a second electrode of the fourteenth transistor is electrically connected to the second electrode of the light emitting device.

In an exemplary implementation, a reset sub-circuit is further included, the duration control sub-circuit includes: a first transistor to a seventh transistor and a first capacitor, the current control sub-circuit includes: an eighth transistor to a thirteenth transistor, a second capacitor and a third capacitor, and the reset sub-circuit includes: a fourteenth transistor;

a control electrode of the first transistor is electrically connected to the first reset signal line, a first electrode of the first transistor is electrically connected to the initial signal line, and a second electrode of the first transistor is electrically connected to a second node;

a control electrode of the second transistor is electrically connected to the first scan signal line, a first electrode of the second transistor is electrically connected to the second node, and a second electrode of the second transistor is electrically connected to a fourth node;

a control electrode of the third transistor is electrically connected to the second node, a first electrode of the third transistor is electrically connected to a third node, and a second electrode of the third transistor is electrically connected to the fourth node;

a control electrode of the fourth transistor is electrically connected to the first scan signal line, a first electrode of the fourth transistor is electrically connected to the data signal line, and a second electrode of the fourth transistor is electrically connected to the third node;

a control electrode of the fifth transistor is electrically connected to the first light emitting signal line, a first electrode of the fifth transistor is electrically connected to the first power supply line, and a second electrode of the fifth transistor is electrically connected to the third node;

a control electrode of the sixth transistor is electrically connected to the first light emitting signal line, a first electrode of the sixth transistor is electrically connected to the fourth node, and a second electrode of the sixth transistor is electrically connected to the first node;

a control electrode of the seventh transistor is electrically connected to the first reset signal line, a first electrode of the seventh transistor is electrically connected to the initial signal line, and a second electrode of the seventh transistor is electrically connected to the first node;

a control electrode of the eighth transistor is electrically connected to the third scan signal line, a first electrode of the eighth transistor is electrically connected to the first node, and a second electrode of the eighth transistor is electrically connected to a fifth node;

a control electrode of the ninth transistor is electrically connected to the second scan signal line, a first electrode of the ninth transistor is electrically connected to the first node, and a second electrode of the ninth transistor is electrically connected to a sixth node;

a control electrode of the tenth transistor is electrically connected to the first node, a first electrode of the tenth transistor is electrically connected to the fifth node, and a second electrode of the tenth transistor is electrically connected to the sixth node;

a control electrode of the eleventh transistor is electrically connected to the second scan signal line, a first electrode of the eleventh transistor is electrically connected to the data signal line, and a second electrode of the eleventh transistor is electrically connected to the fifth node;

a control electrode of the twelfth transistor is electrically connected to the second light emitting signal line, a first electrode of the twelfth transistor is electrically connected to the second power supply line, and a second electrode of the twelfth transistor is electrically connected to the fifth node;

a control electrode of the thirteenth transistor is electrically connected to the second light emitting signal line, a first electrode of the thirteenth transistor is electrically connected to the sixth node, and a second electrode of the thirteenth transistor is electrically connected to the first electrode of the light emitting device;

a control electrode of the fourteenth transistor is electrically connected to the second reset signal line, a first electrode of the fourteenth transistor is electrically connected to the first electrode of the light emitting device, and a second electrode of the fourteenth transistor is electrically connected to the second electrode of the light emitting device;

a first end of the first capacitor is electrically connected to the control signal line and a second end of the first capacitor is electrically connected to the second node;

a first end of the second capacitor is electrically connected to the second power supply line and a second end of the second capacitor is electrically connected to the first node; and a first end of the third capacitor is electrically connected to the first node and a second end of the third capacitor is electrically connected to the first electrode of the light emitting device.

In an exemplary implementation, the third transistor and the eighth transistor are of opposite transistor types, a transistor type of the fifth transistor and the sixth transistor is opposite to a transistor type of the twelfth transistor and the thirteenth transistor, and the eighth transistor and the ninth transistor are of opposite transistor types.

In an exemplary implementation, the first transistor to the seventh transistor, the ninth transistor, the eleventh transistor, and the fourteenth transistor are P-type transistors, and the eighth transistor, the tenth transistor, the twelfth transistor, and the thirteenth transistor are N-type transistors.

In an exemplary implementation, when a signal of the first reset signal line is an effective level signal, signals of the first scan signal line, the second scan signal line, the first light emitting signal line, the second light emitting signal line, the third scan signal line, and the second reset signal line are ineffective level signals;

when a signal of the first scan signal line is an effective level signal, signals of the second scan signal line, the first reset signal line, the third scan signal line, the first light emitting signal line, the second light emitting signal line, and the second reset signal line are ineffective level signals;

when a signal of the second scan signal line is an effective level signal, a signal of the third scan signal line is an effective level signal, and signals of the first scan signal line, the first reset signal line, the first light emitting signal line, the second light emitting signal line, and the second reset signal line are ineffective level signals;

a signal of the first light emitting signal line and a signal of the second light emitting signal line are mutually inverted signals, when the signal of the first light emitting signal line is an effective level signal, the signal of the second light emitting signal line is an effective level signal, and signals of the first scan signal line, the second scan signal line, the first reset signal line, the third scan signal line, and the second reset signal line are ineffective level signals; and when the signal of the second reset signal line is an effective level signal, a signal of the third scan signal line is an effective level signal, and signals of the first reset signal line, the first scan signal line, the second scan signal line, the first light emitting signal line, and the second light emitting signal line are ineffective level signals.

In an exemplary implementation, when the signal of the first light emitting signal line is an effective level signal, a signal of the control signal line is a ramp signal and a voltage value of the signal of the control signal line is gradually decreased;

occurrence time when the signal of the first scan signal line is an effective level signal is earlier than an occurrence time when the signal of the second scan signal line is an effective level signal and a duration when the signal of the first scan signal line is an effective level signal is less than a duration when the signal of the second scan signal line is an effective level signal.

In a second aspect, the present disclosure further provides a display device, which includes multiple sub-modules, at least one of the sub-modules includes multiple rows of sub-pixels, and at least one of the sub-pixels includes the aforementioned pixel drive circuit and a light emitting device driven by the pixel drive circuit.

In an exemplary implementation, any one of the first reset signal line, the third scan signal line, the second reset signal line, the second scan signal line, the first light emitting signal line, and the second light emitting signal line connected to pixel drive circuits of all sub-pixels in a same sub-module has a same signal;

first time corresponding to pixel drive circuits of different rows of sub-pixels in the same sub-module are not overlapped, and first time corresponding to the pixel drive circuit is an occurrence time when the signal of the first scan signal line connected to the pixel drive circuit is an effective level signal;

latest occurrence time in the first time corresponding to the pixel drive circuits of all sub-pixels in the same sub-module is the second time and occurrence time when the signal of the second scan signal line connected to the pixel drive circuit of any one sub-pixel in the same sub-module is an effective level signal is the third time; and the second time is not overlapped with the third time and is earlier than the third time.

In a third aspect, the present disclosure further provides a method for driving a pixel drive circuit and the method is configured to drive the aforementioned pixel drive circuit;

configuring the duration control sub-circuit to provide the control signal to the first node under the control of the signals of the first scan signal line, the first reset signal line, the first light emitting signal line, the control signal line, the data signal line, the initial signal line, and the first power supply line; and configuring the current control sub-circuit to provide the drive current to the first electrode of the light emitting device under the control of the signals of the first node, the second scan signal line, the third scan signal line, the second light emitting signal line, the data signal line, and the second power supply line.

Other aspects may be comprehended upon reading and understanding drawings and detailed description.

BRIEF DESCRIPTION OF THE DRAWINGS

Accompanying drawings are used for providing further understanding of technical solutions of the present disclosure, constitute a part of the specification, and are used for explaining the technical solutions of the present disclosure together with embodiments of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
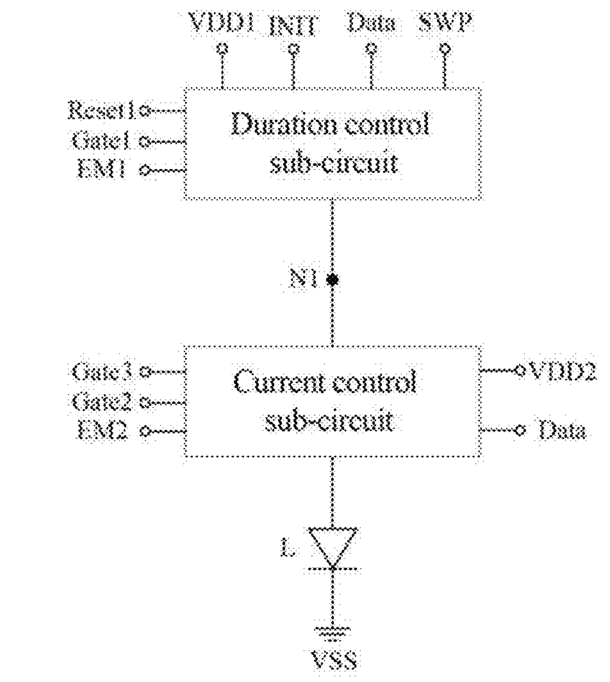
FIG. 1 is a pixel drive circuit according to an embodiment of the present disclosure.

To make the objectives, technical solutions, and advantages of the present disclosure clearer, the embodiments of the present disclosure will be described in detail below with reference to the accompany drawings. It is to be noted that implementations may be implemented in various forms. Those of ordinary skills in the art can easily understand such a fact that implementations and contents may be transformed into various forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict. In order to keep following description of the embodiments of the present disclosure clear and concise, detailed description of part of known functions and known components are omitted in the present disclosure. The drawings in the embodiments of the present disclosure relate only to the structures involved in the embodiments of the present disclosure, and other structures may be described with reference to conventional designs.

Scales of the drawings in the present disclosure may be used as a reference in actual processes, but are not limited thereto. For example, a width-length ratio of a channel, a thickness and spacing of each film layer, and a width and spacing of each signal line may be adjusted according to actual needs. A quantity of pixels in a display device and a quantity of sub-pixels in each pixel are not limited to the quantity shown in the drawings. The drawings described in the present disclosure are schematic structural diagrams only, and one implementation of the present disclosure is not limited to the shapes or numerical values, or the like shown in the drawings.

Ordinal numerals “first”, “second”, “third”, and the like in the specification are set not to form limits in numbers but only to avoid confusion between composition elements.

In the specification, for convenience, expressions “central”, “above”, “below”, “front”, “back”, “vertical”, “horizontal”, “top”, “bottom”, “inside”, “outside” and the like indicating directional or positional relationships are used to illustrate positional relationships between the composition elements, not to indicate or imply that involved devices or elements are required to have specific orientations and be structured and operated with the specific orientations but only to easily and simply describe the present specification, and thus should not be understood as limitations on the present disclosure. The positional relationships between the composition elements may be changed as appropriate according to a direction according to which each composition element is described. Therefore, appropriate replacements based on situations are allowed, which is not limited to the expressions in the specification.

In the specification, unless otherwise specified and defined, terms “mounting”, “mutual connection”, and “connection” should be understood in a broad sense. For example, a “connection” may be a fixed connection, or a detachable connection, or an integral connection; it may be a mechanical connection or an electrical connection; it may be a direct connection, or an indirect connection through a middleware, or internal communication between two elements. Those of ordinary skills in the art can understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region through which a current mainly flows.

In the specification, a first electrode may be a drain electrode, and a second electrode may be a source electrode. Or, the first electrode may be a source electrode, and the second electrode may be a drain electrode. In a case that transistors with opposite polarities are used, or in a case that a direction of a current changes during operation of a circuit, or the like, functions of the “source electrode” and the “drain electrode” are sometimes interchangeable. Therefore, the “source electrode” and the “drain electrode” are interchangeable in the specification.

In the specification, “electrical connection” includes a connection of composition elements through an element with a certain electrical action. An “element with a certain electrical action” is not particularly limited as long as electrical signals between the connected composition elements may be sent and received. Examples of the “element with the certain electrical action” not only include an electrode and a wire, but also include a switch element such as a transistor, a resistor, an inductor, a capacitor, another element with various functions, etc.

In the specification, “parallel” refers to a state in which an angle formed by two straight lines is −10° or more and 10° or less, and thus also includes a state in which the angle is −5° or more and 5° or less. In addition, “perpendicular” refers to a state in which an angle formed by two straight lines is 80° or more and 100° or less, and thus also includes a state in which the angle is 85° or more and 95° or less.

In the specification, a “film” and a “layer” are interchangeable. For example, a “conductive layer” may be replaced with a “conductive film” sometimes. Similarly, an “insulation film” may be replaced with an “insulation layer” sometimes.

In the specification, “disposed in a same layer” refers to a structure formed by patterning two (or more than two) structures through a same patterning process, and their materials may be the same or different. For example, materials of precursors for forming multiple structures disposed in a same layer are the same, and final materials may be the same or different.

Triangle, rectangle, trapezoid, pentagon, hexagon, etc. in this specification are not strictly defined, and they may be approximate triangle, rectangle, trapezoid, pentagon, hexagon, etc. There may be some small deformations caused by tolerance, and there may be chamfer, arc edge, deformation, etc.

In the present disclosure, “about” refers to that a boundary is not defined so strictly and numerical values within a range of process and measurement errors are allowed.

A display device includes multiple sub-modules, a sub-module includes multiple sub-pixels, and a sub-pixel includes multiple pixel drive circuits. A pixel drive circuit includes two parts, one of the two parts is a part for determining a light emitting duration, and the other of the two parts is a part for generating a constant current. Response time of the constant current generated by a pixel drive circuit is long, which makes the pixel drive circuit unable to control a gray scale performance accurately.

FIG. 1 is a schematic diagram of a structure of a pixel drive circuit according to an embodiment of the present disclosure. As shown in FIG. 1, a pixel drive circuit provided by an embodiment of the present disclosure may be configured to drive a light emitting device to emit light. The light emitting device may include a first electrode and a second electrode, and the pixel drive circuit may include a current control sub-circuit and a duration control sub-circuit.

As shown in FIG. 1, the duration control sub-circuit is electrically connected to a first scan signal line Gate1, a first reset signal line Reset1, a first light emitting signal line EM1, a control signal line SWP, a data signal line Data, an initial signal line INIT, a first power supply line VDD1, and a first node N1 respectively, and is configured to provide a control signal to a first node N1 under control of signals of the first scan signal line Gate1, the first reset signal line Reset1, the first light emitting signal line EM1, the control signal line SWP, the data signal line Data, the initial signal line INIT, and the first power supply line VDD1. The current control sub-circuit is electrically connected to a second scan signal line Gate2, a third scan signal line Gate3, a second light emitting signal line EM2, the data signal line Data, a second power supply line VDD2, the first node N1, and a first electrode of the light emitting device L respectively, and is configured to provide a drive current to the first electrode of the light emitting device L under control of signals of the first node N1, the second scan signal line Gate2, the third scan signal line Gate3, the second light emitting signal line EM2, the data signal line Data, and the second power supply line VDD2.

In an exemplary implementation, as shown in FIG. 1, a second electrode of the light emitting device L is electrically connected to a third power supply line VSS.

In an exemplary implementation, the first power supply line supply VDD1 may continuously provide a high voltage power supply signal and the second power supply line supply VDD2 may continuously provide a high voltage power supply signal. A voltage value of the signal of the first power supply line VDD1 and a voltage value of the signal of the second power supply line VDD2 may be the same or may be different.

In an exemplary implementation, the voltage value of the signal of the first power supply line VDD1 or the second power supply line VDD2 may be about 2.5 volts (V) to 3 volts (V), and for example, the voltage value of the signal of the first power supply line VDD1 or the second power supply line VDD2 may be about 2.8 volts (V).

In an exemplary implementation, the third power supply line VSS may continuously provide a low voltage power supply signal.

In an exemplary implementation, a voltage value of the signal of the third power supply line VSS may be about −3 volts (V) to −3.5 volts (V) and the voltage value of the signal of the third power supply line VSS may be about −3.2 volts (V).

In an exemplary embodiment, the light emitting device which includes a current-driven device, may be a current-type light emitting diode, such as a micro light emitting diode (Micro LED for short), or a mini light emitting diode (Mini LED for short), or an organic light emitting diode (OLED for short), or a quantum light emitting diode (QLED for short). A typical size (e.g., a length) of a Micro-LED may be less than 100 μm, e.g., 10 μm to 50 μm. A typical size (e.g., a length) of a Mini-LED may be about 100 μm to 300 μm, e.g., 120 μm to 260 μm.

In an exemplary implementation, the light emitting device L may further include an organic emitting layer located between the first electrode and the second electrode.

In an exemplary implementation, the organic emitting layer may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) that are stacked. In an exemplary implementation, hole injection layers of all sub-pixels may be connected together to be a common layer, electron injection layers of all the sub-pixels may be connected together to be a common layer, hole transport layers of all the sub-pixels may be connected together to be a common layer, electron transport layers of all the sub-pixels may be connected together to be a common layer, hole block layers of all the sub-pixels may be connected together to be a common layer, emitting layers of adjacent sub-pixels may be overlapped slightly or may be isolated, and electron block layers of adjacent sub-pixels may be overlapped slightly or may be isolated.

The pixel drive circuit provided in the present disclosure is configured to drive a light emitting device to emit light. The light emitting device includes a first electrode and a second electrode. The pixel drive circuit includes a current control sub-circuit and a duration control sub-circuit. The duration control sub-circuit is electrically connected to a first scan signal line, a first reset signal line, a first light emitting signal line, a control signal line, a data signal line, an initial signal line, a first power supply line and a first node respectively, and is configured to provide a control signal to the first node under control of signals of the first scan signal line, the first reset signal line, the first light emitting signal line, the control signal line, the data signal line, the initial signal line and the first power supply line. The current control sub-circuit is electrically connected to a second scan signal line, a third scan signal line, a second light emitting signal line, a data signal line, a second power supply line, the first node and a first electrode of the light emitting device respectively, and is configured to provide a drive current to the first electrode of the light emitting device under control of signals of the first node, the second scan signal line, the third scan signal line, the second light emitting signal line, the data signal line and the second power supply line. A second electrode of the light emitting device is electrically connected to the third power supply line. The current control sub-circuit in the present disclosure can reduce response time of a drive current generated by the pixel drive circuit through control of multiple signal lines, and is suitable for a high resolution display product.

Figure 2:
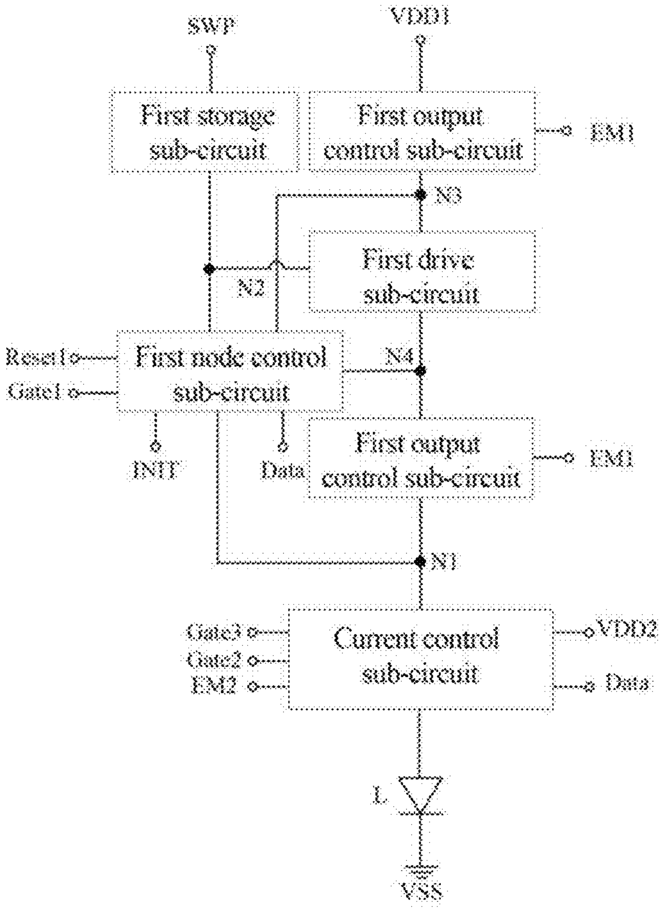
FIG. 2 is a schematic diagram of a structure of a duration control sub-circuit.

In an exemplary implementation, FIG. 2 is a schematic diagram of a structure of a duration control sub-circuit. As shown in FIG. 2, the duration control sub-circuit may include a first node control sub-circuit, a first drive sub-circuit, a first output control sub-circuit, and a first storage sub-circuit.

As shown in FIG. 2, the first node control sub-circuit is electrically connected to a first scan signal line Gate1, a first reset signal line Reset1, an initial signal line INIT, a data signal line Data, a first node N1, a second node N2, a third node N3, and a fourth node N4 respectively, and is configured to drive a signal of the second node N2 under a control of signals of the first scan signal line Gate1 and the data signal line Data, and to provide a signal of the initial signal line INIT to the first node N1 and the second node N2 under a control of a signal of the first reset signal line Reset1; the first drive sub-circuit is electrically connected to the second node N2, the third node N3 and the fourth node N4 respectively, and is configured to provide a drive signal to the fourth node N4 under a control of signals of the second node N2 and the third node N3; the first output control sub-circuit is electrically connected to the first light emitting signal line EM1, the first node N1, the third node N3, the fourth node N4, and the first power supply line VDD1 respectively, and is configured to provide a signal of the first power supply line VDD1 to the third node N3 and a signal of the fourth node N4 to the first node N1 under a control of a signal of the first light emitting signal line EM1; the first storage sub-circuit is electrically connected to the second node N2 and a control signal line SWP respectively, and is configured to store a voltage difference between signals of the second node N2 and the control signal line SWP.

Figure 3:
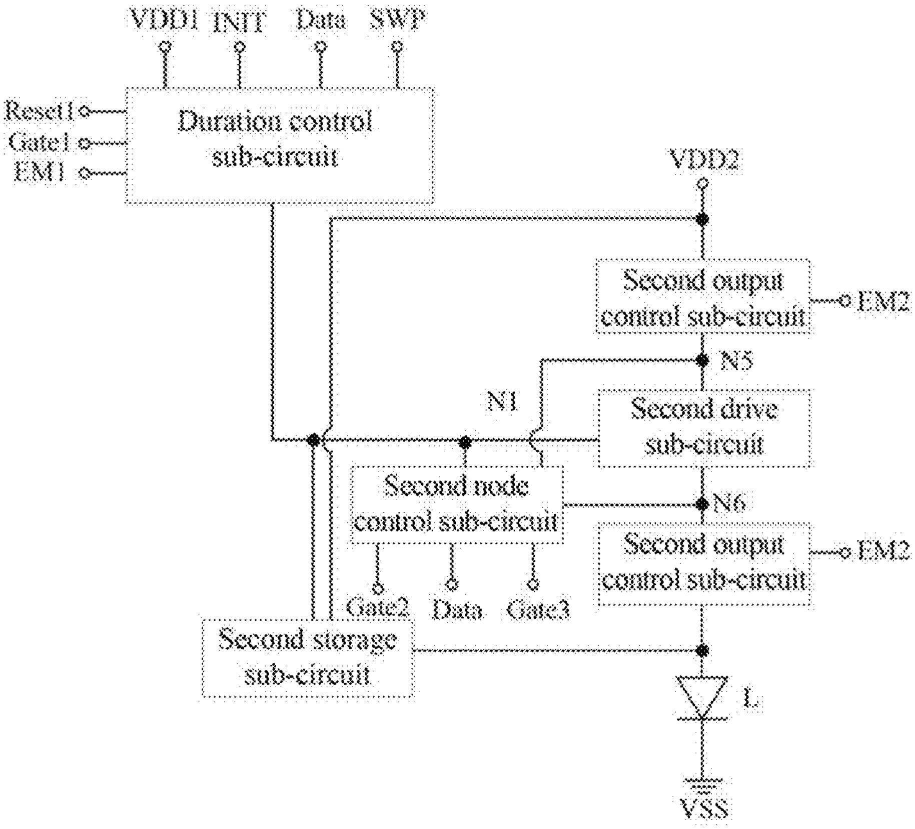
FIG. 3 is a schematic diagram of a structure of a current control sub-circuit.

In an exemplary implementation, FIG. 3 is a schematic diagram of a structure of a current control sub-circuit. As shown in FIG. 3, the current control sub-circuit may include a second node control sub-circuit, a second drive sub-circuit, a second output control sub-circuit, and a second storage sub-circuit.

As shown in FIG. 3, the second node control sub-circuit is electrically connected to a second scan signal line Gate2, a third scan signal line Gate3, a data signal line Data, a first node N1, a fifth node N5, and a sixth node N6 respectively, and is configured to drive a signal of the first node N1 under a control of signals of the second scan signal line Gate2, the third scan signal line Gate3, the data signal line Data, the fifth node N5, and the sixth node N6; the second drive sub-circuit is electrically connected to the first node N1, the fifth node N5, and the sixth node N6 respectively, and is configured to provide a drive current to the sixth node N6 under a control of signals of the first node N1 and the fifth node N5; the second output control sub-circuit electrically connected to a second light emitting signal line EM2, a second power supply line VDD2, the fifth node N5, the sixth node N6, and a first electrode of the light emitting device L respectively, and is configured to provide a signal of the second power supply line VDD2 to the fifth node N5 and a drive current to the first electrode of the light emitting device L under a control of a signal of the second light emitting signal line EM2; the second storage sub-circuit is electrically connected to the first node N1, the second power supply line VDD2, and the first electrode of the light emitting device L respectively, and is configured to store a voltage difference between signals of the first node N1 and the second power supply line VDD2 and a voltage difference between signals of the first node N1 and the first electrode of the light emitting device L.

Figure 4:
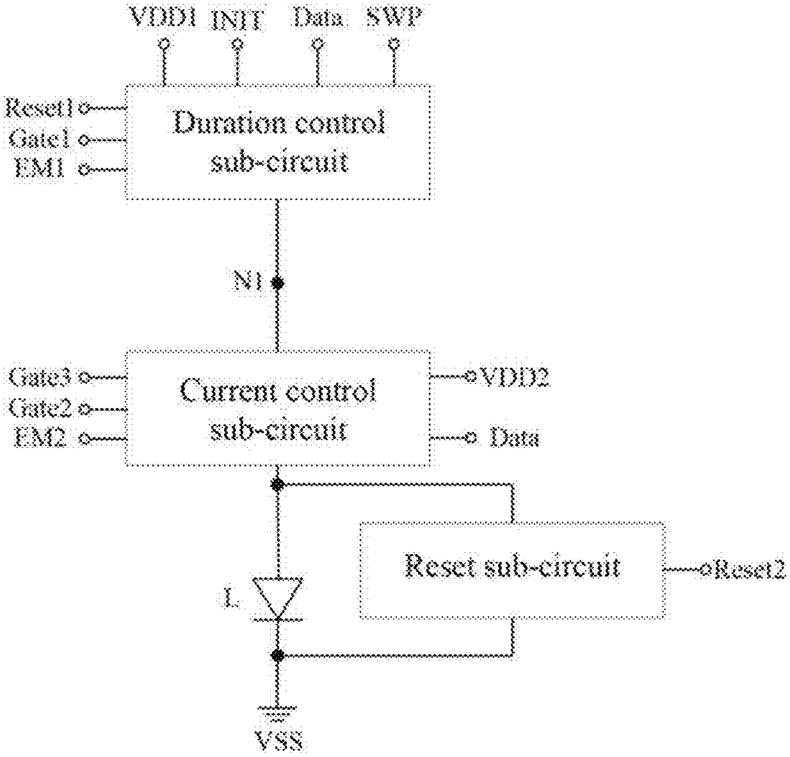
FIG. 4 is a schematic diagram of a structure of a pixel drive circuit according to an exemplary implementation.

In an exemplary implementation, FIG. 4 is a schematic diagram of a structure of a pixel drive circuit according to an exemplary implementation. As shown in FIG. 4, the pixel drive circuit may further include a reset sub-circuit. Among them, the reset sub-circuit is electrically connected to a second reset signal line Reset2, a first electrode of the light emitting device L, and a second electrode of the light emitting device L respectively, and is configured to provide a signal of the second electrode of the light emitting device L to the first electrode of the light emitting device L under a control of a signal of the second reset signal line Reset2.

Figure 5:
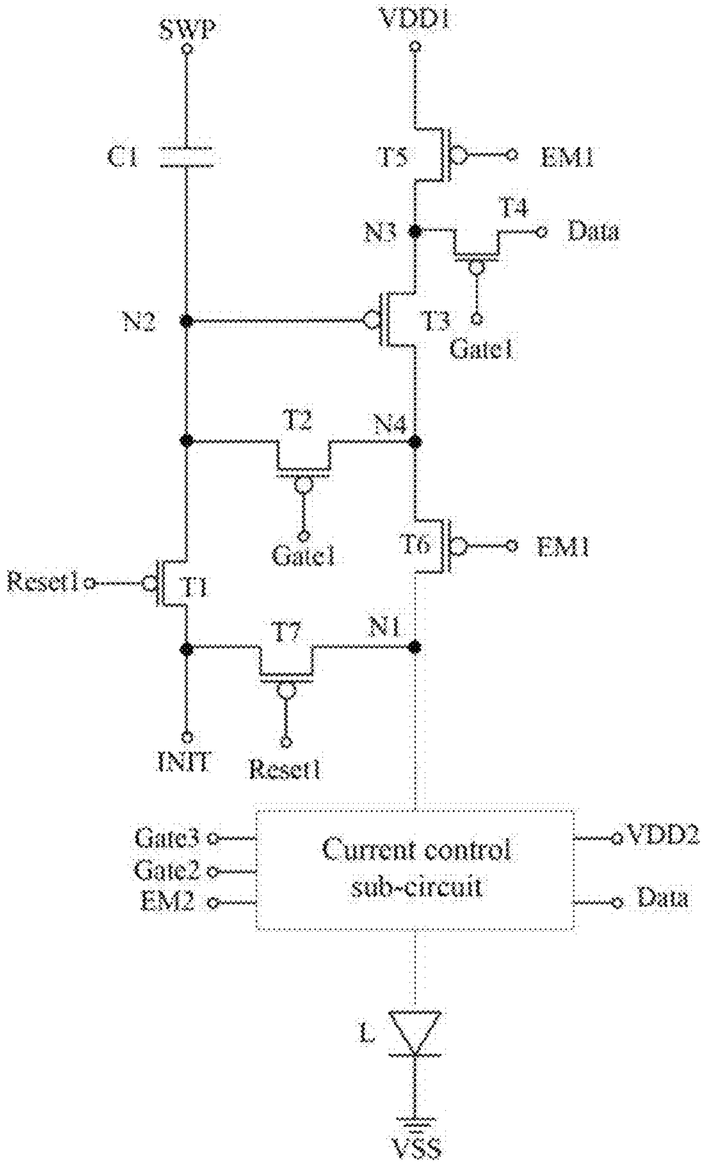
FIG. 5 is an equivalent circuit diagram of a duration control sub-circuit.

In an exemplary implementation, FIG. 5 is an equivalent circuit diagram of a duration control sub-circuit. As shown in FIG. 5, the first node control sub-circuit includes a first transistor T1, a second transistor T2, a fourth transistor T4, and a seventh transistor T7, the first drive sub-circuit includes a third transistor T3, and the first output control sub-circuit includes a fifth transistor T5 and a sixth transistor T6.

As shown in FIG. 5, a control electrode of the first transistor T1 is electrically connected to a first reset signal line Reset1, a first electrode of the first transistor T1 is electrically connected to an initial signal line INIT, and a second electrode of the first transistor T1 is electrically connected to a second node N2; a control electrode of the second transistor T2 is electrically connected to a first scan signal line Gate1, a first electrode of the second transistor T2 is electrically connected to the second node N2, and a second electrode of the second transistor T2 is electrically connected to a fourth node N4; a control electrode of the third transistor T3 is electrically connected to the second node N2, a first electrode of the third transistor T3 is electrically connected to a third node N3, and a second electrode of the third transistor T3 is electrically connected to the fourth node N4; a control electrode of the fourth transistor T4 is electrically connected to the first scan signal line Gate1, a first electrode of the fourth transistor T4 is electrically connected to a data signal line Data, and a second electrode of the fourth transistor T4 is electrically connected to the third node N3; a control electrode of the fifth transistor T5 is electrically connected to a first light emitting signal line EM1, a first electrode of the fifth transistor T5 is electrically connected to a first power supply line VDD1, and a second electrode of the fifth transistor T5 is electrically connected to the third node N3; a control electrode of the sixth transistor T6 is electrically connected to the first light emitting signal line EM1, a first electrode of the sixth transistor T6 is electrically connected to the fourth node N4, and a second electrode of the sixth transistor T6 is electrically connected to a first node N1; a control electrode of the seventh transistor T7 is electrically connected to the first reset signal line Reset1, a first electrode of the seventh transistor T7 is electrically connected to the initial signal line INIT, and a second electrode of the seventh transistor T7 is electrically connected to the first node N1.

In an exemplary implementation and as shown in FIG. 5, the first storage sub-circuit may include a first capacitor C1. Among them, a first end of the first capacitor C1 is electrically connected to the control signal line SWP and a second end of the first capacitor C1 is electrically connected to the second node N2.

An exemplary structure of the duration control sub-circuit is shown in FIG. 5. It will be readily understood by those skilled in the art that implementation of the duration control sub-circuit is not limited thereto.

Figure 6:
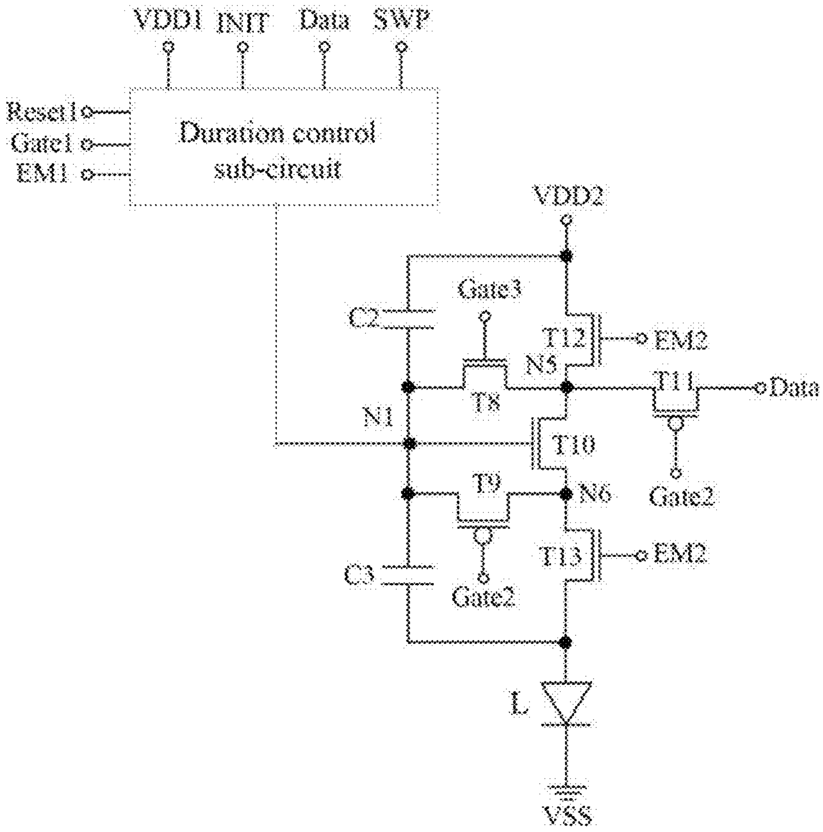
FIG. 6 is an equivalent circuit diagram of a current control sub-circuit.

In an exemplary implementation, FIG. 6 is an equivalent circuit diagram of a current control sub-circuit. As shown in FIG. 6, the second node control sub-circuit may include an eighth transistor T8, a ninth transistor T9, and an eleventh transistor T11.

As shown in FIG. 6, a control electrode of the eighth transistor T8 is electrically connected to a third scan signal line Gate3, a first electrode of the eighth transistor T8 is electrically connected to a first node N1, and a second electrode of the eighth transistor T8 is electrically connected to a fifth node N5. A control electrode of the ninth transistor T9 is electrically connected to a second scan signal line Gate2, a first electrode of the ninth transistor T9 is electrically connected to the first node N1, and a second electrode of the ninth transistor T9 is electrically connected to a sixth node N6. A control electrode of the eleventh transistor T11 is electrically connected to the second scan signal line Gate2, a first electrode of the eleventh transistor T11 is electrically connected to a data signal line Data, and a second electrode of the eleventh transistor T11 is electrically connected to the fifth node N5.

In an exemplary implementation and as shown in FIG. 6, the second drive sub-circuit may include a tenth transistor T10 and the second output control sub-circuit may include a twelfth transistor T12 and a thirteenth transistor T13.

As shown in FIG. 6, a control electrode of the tenth transistor T10 is electrically connected to the first node N1, a first electrode of the tenth transistor T10 is electrically connected to the fifth node N5, and a second electrode of the tenth transistor T10 is electrically connected to the sixth node N6. A control electrode of the twelfth transistor T12 is electrically connected to a second light emitting signal line EM2, a first electrode of the twelfth transistor T12 is electrically connected to a second power supply line VDD2, and a second electrode of the twelfth transistor T12 is electrically connected to the fifth node N5. A control electrode of the thirteenth transistor T13 is electrically connected to the second light emitting signal line EM2, a first electrode of the thirteenth transistor T13 is electrically connected to the sixth node N6, and a second electrode of the thirteenth transistor T13 is electrically connected to a first electrode of the light emitting device.

In an exemplary implementation and as shown in FIG. 6, the second storage sub-circuit may include a second capacitor C2 and a third capacitor C3.

As shown in FIG. 6, a first end of the second capacitor C2 is electrically connected to the second power supply line VDD2 and a second end of the second capacitor C2 is electrically connected to the first node N1. A first end of the third capacitor C3 is electrically connected to the first node N1 and a second end of the third capacitor C3 is electrically connected to the first electrode of the light emitting device.

An exemplary structure of a current control sub-circuit is shown in FIG. 6. It will be readily understood by those skilled in the art that implementations of the current control sub-circuit are not limited thereto.

Figure 7:
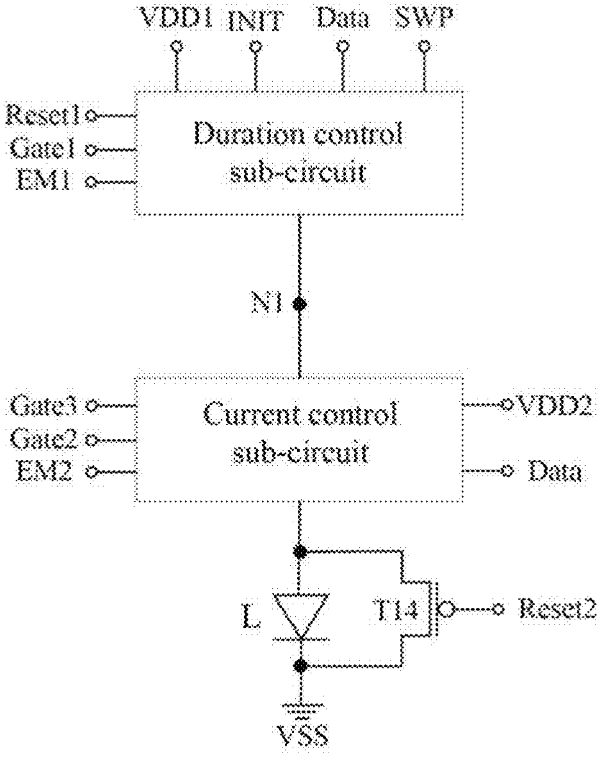
FIG. 7 is an equivalent circuit diagram of a reset sub-circuit.

In an exemplary implementation, FIG. 7 is an equivalent circuit diagram of a reset sub-circuit. As shown in FIG. 7, the reset sub-circuit includes a fourteenth transistor T14. A control electrode of the fourteenth transistor T14 is electrically connected to a second reset signal line Reset2, a first electrode of the fourteenth transistor T14 is electrically connected to a first electrode of a light emitting device, and a second electrode of the fourteenth transistor T14 is electrically connected to a second electrode of the light emitting device.

An exemplary structure of a reset sub-circuit is shown in FIG. 7. It will be readily understood by those skilled in the art that implementations of the reset sub-circuit are not limited thereto.

Figure 8:
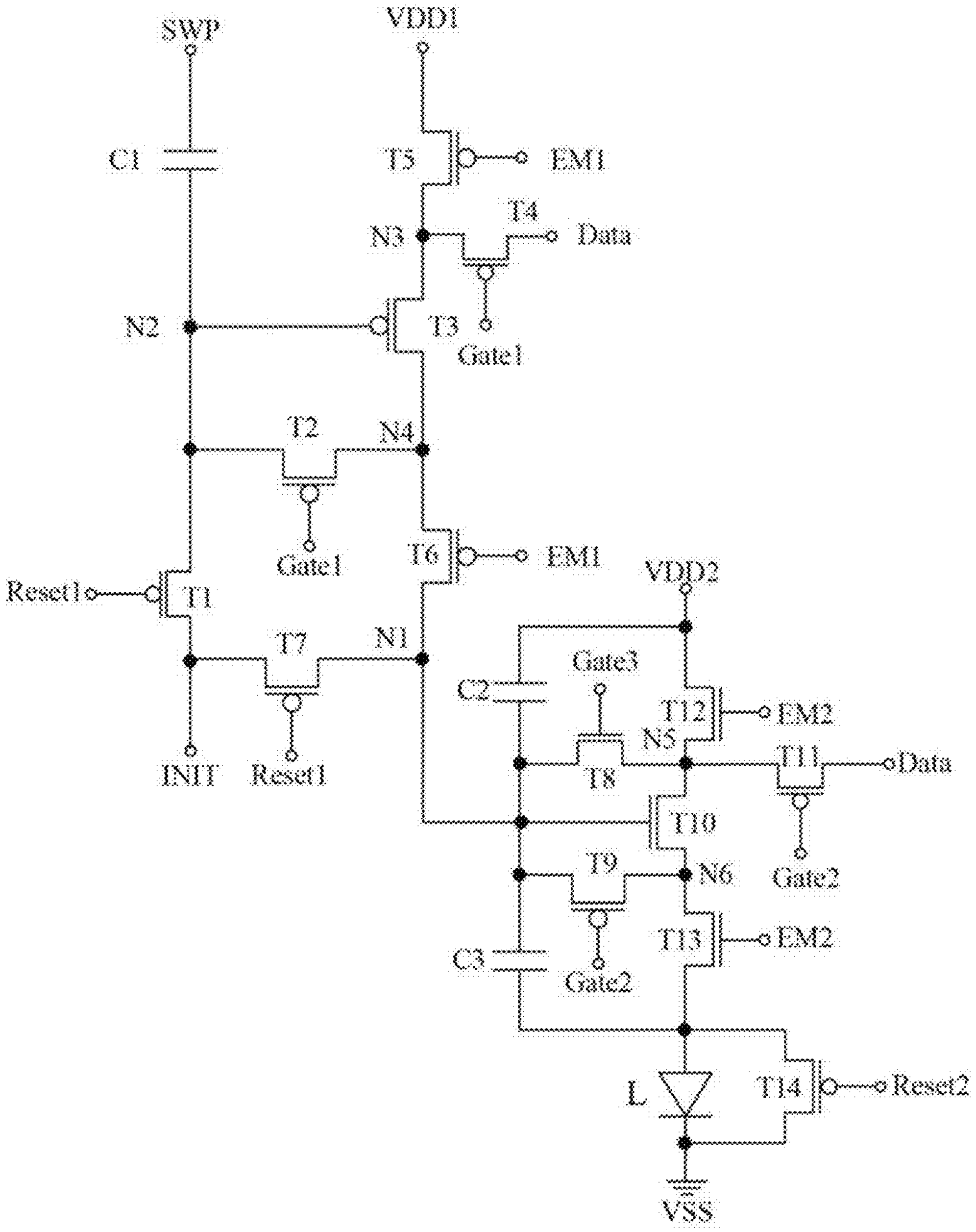
FIG. 8 is an equivalent circuit diagram of a pixel drive circuit.

FIG. 8 is an equivalent circuit diagram of a pixel drive circuit. As shown in FIG. 8, and in a pixel drive circuit, a duration control sub-circuit includes a first transistor T1 to a seventh transistor T7 and a first capacitor C1, a current control sub-circuit includes an eighth transistor T8 to a thirteenth transistor T13, a second capacitor C2 and a third capacitor C3, and a reset sub-circuit includes a fourteenth transistor T14.

As shown in FIG. 8, a control electrode of the first transistor T1 is electrically connected to a first reset signal line Reset1, a first electrode of the first transistor T1 is electrically connected to an initial signal line INIT, and a second electrode of the first transistor T1 is electrically connected to a second node N2. A control electrode of the second transistor T2 is electrically connected to a first scan signal line Gate1, a first electrode of the second transistor T2 is electrically connected to the second node N2, and a second electrode of the second transistor T2 is electrically connected to a fourth node N4. A control electrode of the third transistor T3 is electrically connected to the second node N2, a first electrode of the third transistor T3 is electrically connected to a third node N3, and a second electrode of the third transistor T3 is electrically connected to the fourth node N4. A control electrode of the fourth transistor T4 is electrically connected to the first scan signal line Gate1, a first electrode of the fourth transistor T4 is electrically connected to a data signal line Data, and a second electrode of the fourth transistor T4 is electrically connected to the third node N3. A control electrode of the fifth transistor T5 is electrically connected to a first light emitting signal line EM1, a first electrode of the fifth transistor T5 is electrically connected to a first power supply line VDD1, and a second electrode of the fifth transistor T5 is electrically connected to the third node N3. A control electrode of the sixth transistor T6 is electrically connected to the first light emitting signal line EM1, a first electrode of the sixth transistor T6 is electrically connected to the fourth node N4, and a second electrode of the sixth transistor T6 is electrically connected to a first node N1. A control electrode of the seventh transistor T7 is electrically connected to the first reset signal line Reset1, a first electrode of the seventh transistor T7 is electrically connected to the initial signal line INIT, and a second electrode of the seventh transistor T7 is electrically connected to the first node N1. A control electrode of the eighth transistor T8 is electrically connected to a third scan signal line Gate3, a first electrode of the eighth transistor T8 is electrically connected to the first node N1, and a second electrode of the eighth transistor T8 is electrically connected to a fifth node N5. A control electrode of the ninth transistor T9 is electrically connected to a second scan signal line Gate2, a first electrode of the ninth transistor T9 is electrically connected to the first node N1, and a second electrode of the ninth transistor T9 is electrically connected to a sixth node N6. A control electrode of the tenth transistor T10 is electrically connected to the first node N1, a first electrode of the tenth transistor T10 is electrically connected to the fifth node N5, and a second electrode of the tenth transistor T10 is electrically connected to the sixth node N6. A control electrode of the eleventh transistor T11 is electrically connected to the second scan signal line Gate2, a first electrode of the eleventh transistor T11 is electrically connected to the data signal line Data, and a second electrode of the eleventh transistor T11 is electrically connected to the fifth node N5. A control electrode of the twelfth transistor T12 is electrically connected to a second light emitting signal line EM2, a first electrode of the twelfth transistor T12 is electrically connected to a second power supply line VDD2, and a second electrode of the twelfth transistor T12 is electrically connected to the fifth node N5. A control electrode of the thirteenth transistor T13 is electrically connected to the second light emitting signal line EM2, a first electrode of the thirteenth transistor T13 is electrically connected to the sixth node N6, and a second electrode of the thirteenth transistor T13 is electrically connected to a first electrode of the light emitting device. A control electrode of the fourteenth transistor T14 is electrically connected to a second reset signal line Reset2, a first electrode of the fourteenth transistor T14 is electrically connected to the first electrode of the light emitting device, and a second electrode of the fourteenth transistor T14 is electrically connected to a second electrode of the light emitting device. A first end of the first capacitor C1 is electrically connected to the control signal line, and a second end of the first capacitor C1 is electrically connected to the second node N2. A first end of the second capacitor C2 is electrically connected to the second power supply line VDD2, and a second end of the second capacitor C2 is electrically connected to the first node N1. A first end of the third capacitor C3 is electrically connected to the first node N1, and a second end of the third capacitor C3 is electrically connected to the first electrode of the light emitting device.

In an exemplary implementation, the first transistor T1 may be referred to as a second node reset transistor. When a signal of the first reset signal line Reset1 is an effective level signal, a signal of the initial signal line INIT is written to the second node N2.

In an exemplary implementation, the second transistor T2 may be referred to as a first compensation transistor. When a signal of the first scan signal line Gate1 is an effective level signal, a signal of the fourth node N4 is written to the second node N2 to compensate the second node N2.

In an exemplary implementation, the third transistor T3 may be referred to as a first drive transistor. The third transistor T3 determines a control signal flowing between the first power supply line VDD1 and the first node N1 according to a potential difference between the gate electrode and the first electrode of the third transistor T3.

In an exemplary implementation, the fourth transistor T4 may be referred to as a first write transistor. When the signal of the first scan signal line Gate1 is an effective level signal, a signal of the data signal line Data is written to the third node N3.

In an exemplary implementation, the fifth transistor T5 and the sixth transistor T6 may be referred to as output transistors. When a signal of the first light emitting signal line EM1 is an effective level signal, the fifth transistor T5 and the sixth transistor T6 form a pathway between the first power supply line VDD1 and the first node N1.

In an exemplary implementation, the seventh transistor T7 may be referred to as a first node reset transistor. When the signal of the first reset signal line Reset1 is an effective level signal, a signal of the initial signal line INIT is written to the first node N1.

In an exemplary implementation, the eighth transistor T8 may be referred to as a second compensation transistor. When a signal of the third scan signal line Gate3 is an effective level signal, a signal of the fifth node N5 is written to the first node N1 to compensate the first node N1.

In an exemplary implementation, the ninth transistor T9 may be referred to as a third compensation transistor. When a signal of the second scan signal line Gate2 is an effective level signal, a signal of the sixth node N6 is written to the first node N1 to compensate the first node N1.

In an exemplary implementation, the tenth transistor T10 may be referred to as a second drive transistor. The tenth transistor T10 determines a drive current flowing between the second power supply line VDD2 and the third power supply line VSS according to a potential difference between the gate electrode and the first electrode of the tenth transistor T10.

In an exemplary implementation, the eleventh transistor T11 may be referred to as a second write transistor. When a signal of the second scan signal line Gate2 is an effective level signal, the signal of the data signal line Data is written to the fifth node N5.

In an exemplary implementation, the twelfth transistor T12 and the thirteenth transistor 13 may be referred to as light emitting transistors. When a signal of the second light emitting signal line EM2 is an effective level signal, the twelfth transistor T12 and the thirteenth transistor 13 drive the light emitting device L to emit light by forming the current path for a drive current between the second power supply line VDD2 and the third power supply line VDD.

In an exemplary implementation, the fourteenth transistor T14 may be referred to as an anode reset transistor. When a signal of the second reset signal line Reset2 is an effective level signal, a signal of the third power supply line VSS is written to the first electrode (anode) of the light emitting device L.

Transistors may be divided into N-type transistors and P-type transistors according to their characteristics. When a transistor is a P-type transistor, a turn-on voltage is a low level voltage (e.g., 0V, −5 V, −10 V, or another suitable voltage), and a turn-off voltage is a high level voltage (e.g., 5 V, 10 V, or another suitable voltage). When a transistor is an N-type transistor, the turn-on voltage is a high level voltage (e.g., 5 V, 10 V, or another suitable voltage), and the turn-off voltage is a low level voltage (e.g., 0 V, −5 V, −10 V, or another suitable voltage).

In an exemplary implementation, the first transistor T1 to the fourteenth transistor T14 may be P-type transistors, or may be N-type transistors. Use of a same type of transistors in a pixel drive circuit may simplify a process flow, reduce a process difficulty of a display panel, and improve a product yield. In some possible implementations, the first transistor T1 to the fourteenth transistor T14 may include a P-type transistor and an N-type transistor.

In an exemplary implementation, for the first transistor T1 to the fourteenth transistor T14, low temperature poly-crystalline silicon thin film transistors may be used, or oxide thin film transistors may be used, or both a low temperature poly-crystalline silicon thin film transistor and an oxide thin film transistor may be used. An active layer of a low temperature poly-crystalline silicon thin film transistor may be made of Low Temperature Poly-crystalline silicon (LTPS for short), and an active layer of an oxide thin film transistor may be made of an oxide semiconductor (Oxide). Low temperature poly-crystalline silicon thin film transistors have advantages such as high migration rate and fast charging, and oxide thin film transistors have advantages such as low leakage current. The low temperature poly-crystalline silicon thin film transistors and the oxide thin film transistors are integrated on one display device to form a low temperature poly-crystalline oxide (LTPO) display device, so that the advantages of both the low temperature poly-crystalline silicon thin film transistors and the oxide thin film transistors can be utilized, low frequency driving can be achieved, power consumption can be decreased, and display quality can be improved.

In an exemplary implementation, the third transistor T3 and the eighth transistor T8 are of opposite transistor types.

In an exemplary implementation, a transistor type of the fifth transistor T5 and the sixth transistor T6 is opposite to a transistor type of the twelfth transistor T12 and the thirteenth transistor T13.

In an exemplary implementation, the eighth transistor T8 and the ninth transistor T9 are of opposite transistor types.

In an exemplary implementation, the first transistor T1 to the seventh transistor T7, the ninth transistor T9, the eleventh transistor T11, and the fourteenth transistor T14 may be P-type transistors.

In an exemplary implementation, the eighth transistor T8, the tenth transistor T10, the twelfth transistor T12, and the thirteenth transistor T13 are N-type transistors. Among them, an N-type transistor may be an oxide thin film transistor or a low-temperature poly-crystalline silicon thin film transistor.

In an exemplary implementation, when a signal of the first reset signal line Reset1 is an effective level signal, signals of the first scan signal line Gate1, the second scan signal line Gate2, the first light emitting signal line EM1, the second light emitting signal line EM2, the third scan signal line Gate3, and the second reset signal line Reset2 are ineffective level signals.

In an exemplary implementation, when a signal of the first scan signal line Gate1 is an effective level signal, signals of the second scan signal line Gate2, the first reset signal line Reset1, the third scan signal line Gate3, the first light emitting signal line EM1, the second light emitting signal line EM2, and the second reset signal line Reset2 are ineffective level signals.

In an exemplary implementation, when a signal of the second scan signal line Gate2 is an effective level signal, a signal of the third scan signal line Gate3 is an effective level signal, and signals of the first scan signal line Gate1, the first reset signal line Reset1, the first light emitting signal line EM1, the second light emitting signal line EM2, and the second reset signal line Reset2 are ineffective level signals.

In an exemplary implementation, a signal of the first light emitting signal line EM1 and a signal of the second light emitting signal line EM2 are inverted signals for each other. When the signal of the first light emitting signal line EM1 is an effective level signal, the signal of the second light emitting signal line EM2 is an effective level signal and signals of the first scan signal line Gate1, the second scan signal line Gate2, the first reset signal line Reset1, the third scan signal line Gate3, and the second reset signal line Reset2 are ineffective level signals.

In an exemplary implementation, when the signal of the second reset signal line Reset2 is an effective level signal, the signal of the third scan signal line Gate3 is an effective level signal and signals of the first reset signal line Reset1, the first scan signal line Gate1, the second scan signal line Gate2, the first light emitting signal line EM1, and the second light emitting signal line EM2 are ineffective level signals.

In an exemplary implementation, occurrence time when the signal of the first scan signal line Gate1 is an effective level signal is earlier than occurrence time when the signal of the second scan signal line Gate2 is an effective level signal, and a duration for which the signal of the first scan signal line Gate1 is the effective level signal is less than a duration for which the signal of the second scan signal line Gate2 is the effective level signal.

In an exemplary implementation, when the signal of the first reset signal line Reset1 is an effective level signal, a signal of the initial signal line INIT is a first initial signal, and a voltage value of the first initial signal may be equal to a voltage value of a signal of the third power supply line. When the signal of the first reset signal line Reset1 is an ineffective level signal, the signal of the initial signal line INIT is a second initial signal, and a voltage value of the second initial signal may be equal to a voltage value of a signal of the first power supply line VDD1.

In an exemplary implementation, before the signal of the first light emitting signal line EM1 is the effective level signal, a signal of the control signal line SWP is a first control signal, and the first control signal is a constant voltage signal, a voltage value of the first control signal may be 5 volts to 7 volts, and for example the voltage value of the first control signal may be 6 volts. When the signal of the first light emitting signal line EM1 is the effective level signal, the signal of the control signal line SWP is a second control signal, and the second control signal is a ramp signal, and a voltage value of the second control signal is gradually decreased until it drops to 0 volt. After the signal of the first light emitting signal line EM1 is the effective level signal, the signal of the control signal line SWP is restored to the first control signal.

Figure 9:
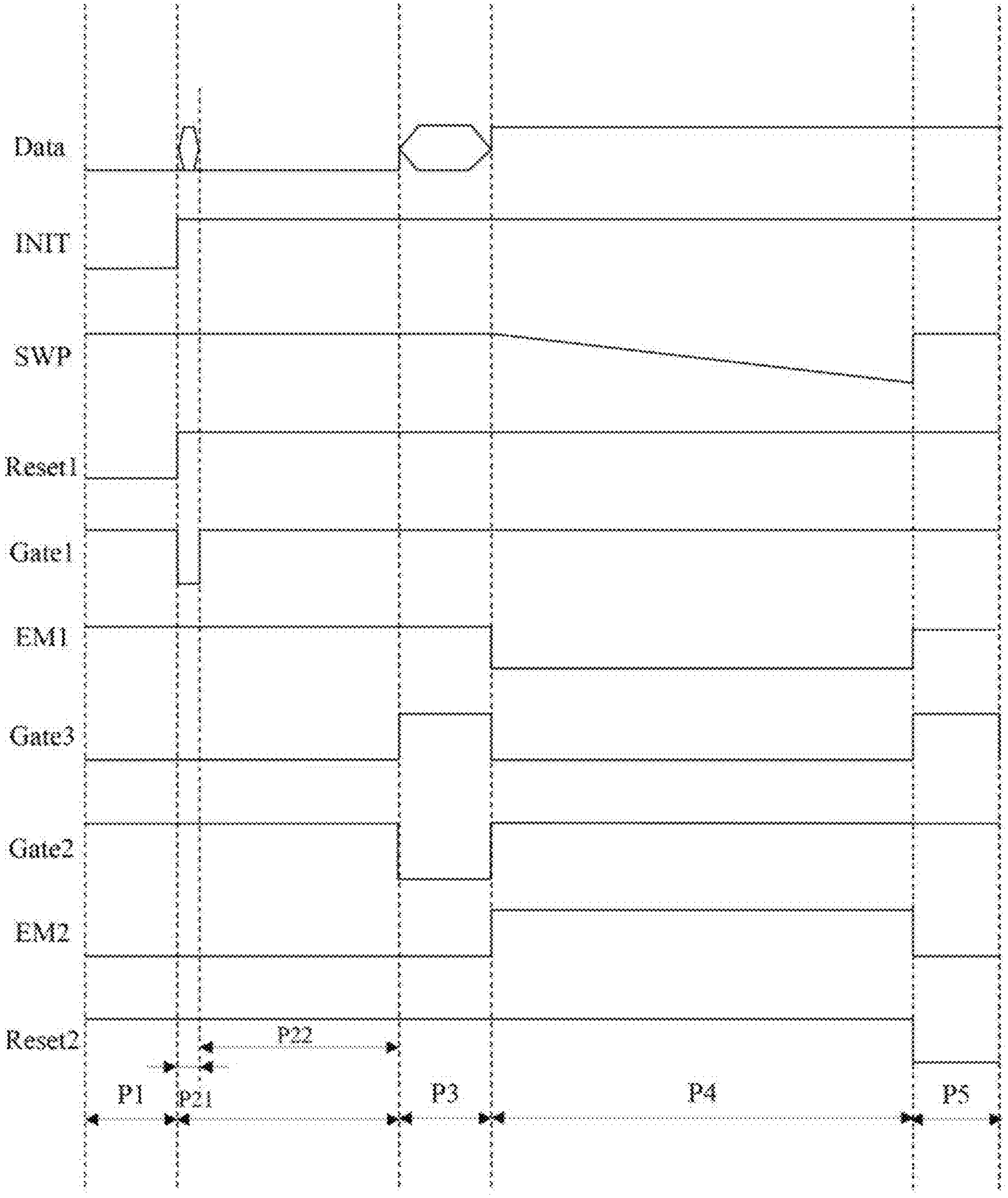
FIG. 9 is a working timing diagram of a pixel drive circuit.

FIG. 9 is a working timing diagram of a pixel drive circuit. An exemplary embodiment of the present disclosure will be described below with reference to a working process of a pixel drive circuit exemplified in FIG. 8. The pixel drive circuit in FIG. 8 includes fourteen transistors (first transistors T1 to fourteenth transistors T14) and three capacitors (first capacitor C1, second capacitor C2 and third capacitor C3), the first transistors T1 to ninth transistors T9 and fourteenth transistors T14 are P-type transistors, and the tenth transistors T10 to thirteenth transistors T13 are N-type transistors.

In an exemplary implementation, the working process of the pixel drive circuit may include following stages.

In a first stage P1, which is referred to as an initialization stage, signals of the first reset signal line Reset1, the third scan signal line Gate3, and the second light emitting signal line EM are low level signals, and signals of the first scan signal line Gate1, the second scan signal line Gate2, the first light emitting signal line EM1, and the second reset signal line Reset2 are high level signals. A signal of the first reset signal line Reset1 is a low level signal, so that the first transistor T1 and the seventh transistor T7 are turned on, an initial signal of the initial signal line INIT is written to a second node N2 through the turned-on first transistor T1 to initialize (reset) the second node N2 and clear the pre-stored voltage in the second node N2 to complete initialization, and the initial signal of the initial signal line INIT is written to a first node N1 through the turned on-seventh transistor T7 to initialize (reset) the first node N1 and clear the pre-stored voltage in the first node N1 to complete initialization. Signals of the first scan signal line Gate1 and the first light emitting signal line EM1 are high level signals, so that the second transistors T2, the fourth transistor T4, the fifth transistor T5, and the sixth transistor T6 are turned off, a signal of the second scan signal line Gate2 is a high level signal, so that the ninth transistors T9 and the eleventh transistors T11 are turned off, signals of the third scan signal line Gate3 and the second light emitting signal line EM are low level signals, and the eighth transistor T8, the twelfth transistor T12 and the thirteenth transistor T13 are turned off. At this time, a difference between voltage values of signals of the second node N2 and the third node N3 is less than a threshold voltage of the third transistor T3, and the third transistor T3 is turned on. Voltage value of a signal between the first node N1 and the fifth node N5 is greater than a threshold voltage of the tenth transistor T10, and the tenth transistor T10 is turned on. A signal of the second reset signal line Reset2 is a high level signal, so that the fourteenth transistor T14 is turned off. The light emitting device L does not emit light in this stage.

In a second stage P2, which is referred to as a first data write stage or a first threshold compensation stage, signals of the third scan signal line Gate3 and the second light emitting signal line EM are low level signals, and signals of the first reset signal line Reset1, the second scan signal line Gate2, the first light emitting signal line EM1 and the second reset signal line Reset2 are high level signals. The second stage P2 includes a first sub-stage P21 and a second sub-stage P22, occurrence time of the first sub-stage P21 may be before, within or after occurrence time of the second sub-stage P22, depending on a location of the pixel drive circuit. In FIG. 9, illustration is made by taking a case in which the occurrence time of the first sub-stage P21 may be before the occurrence time of the second sub-stage P22.

In the first sub-stage P21, a first data signal is written to the data signal line Data, a signal of the first scan signal line Gate1 is a low level signal, so that the second transistor T2 and the fourth transistor T4 are turned on, the first data signal is charged to the second node N2 through the turned-on fourth transistor T4, the third node N3, the turned on third transistor T3, the fourth node N4, and the turned-on second transistor T2 until a voltage value of a signal of the second node N2 satisfies $V2=Vdata_1-Vth_3$, where Vdata is a voltage value of the first data signal and $Vth_3$ is a threshold voltage of the third transistor, signals of the first reset signal line Reset1 and the first light emitting signal line EM1 are high level signals, and the first transistor T1, the fifth transistor T5, the sixth transistor T6, and the seventh transistor T7 are turned off. The signal of the second scan signal line Gate2 is a high level signal, so that the ninth transistor T9 and the eleventh transistor T11 are turned off, signals of the third scan signal line Gate3 and the second light emitting signal line EM are low level signals, and the eighth transistor T8, the twelfth transistor T12, and the thirteenth transistor T13 are turned off. The signal of the second reset signal line Reset2 is a high level signal, so that the fourteenth transistor T14 is turned off. The light emitting device L does not emit light in this stage.

In the second sub-stage P22, the signal of the first scan signal line Gate1 is a low level signal, so that the second transistor T2 and the fourth transistor T4 are turned off, the signal of the second node N2 is kept to be the high level signal of the previous stage under an action of the first capacitor C1, the signals of the first reset signal line Reset1 and the first light emitting signal line EM1 are high level signals, so that the first transistor T1, the fifth transistor T5, the sixth transistor T6, and the seventh transistor T7 are turned off. The signal of the second scan signal line Gate2 is a high level signal, so that the ninth transistor T9 and the eleventh transistor T11 are turned off, the signals of the third scan signal line Gate3 and the second light emitting signal line EM are low level signals, so that the eighth transistor T8, the twelfth transistor T12, and the thirteenth transistor T13 are turned off. The signal of the second reset signal line Reset2 is a high level signal, so that the fourteenth transistor T14 is turned off. The light emitting device L does not emit light in this stage.

In a third stage P3, which is referred to as a second data write stage or a second threshold compensation stage, signals of the second scan signal line Gate2 and the second light emitting signal line EM2 are low level signals, signals of the first scan signal line Gate1, the first reset signal line Reset1, the third scan signal line Gate3, the first light emitting signal line EM1, and the second reset signal line Reset2 are high level signals, so that a second data signal is written to the data signal line Data. A signal of the third scan signal line Gate3 is a high level signal, so that the eighth transistor T8 is turned on, the signal of the second scan signal line Gate2 is a low level signal, so that the ninth transistor T9 and the eleventh transistor T11 are turned on, the second data signal is written to the fifth node N5 through the turned-on eleventh transistor T11, and a signal of the fifth node N5 is charged to the first node N1 through the turned-on eighth transistor T8, the turned-on tenth transistor T10, the sixth node N6, and the turned-on ninth transistor T9 respectively, until a voltage value of a signal of the first node N1 satisfies $V1=Vdata_2+Vth_{10}$, where $Vdata_2$ is a voltage value of the second data signal and $Vth_{10}$ is a threshold voltage of the tenth transistor. The signal of the first scan signal line Gate1 is a high level signal, so that the second transistor T2 and the fourth transistor T4 are turned off, the signals of the first reset signal line Reset1 and the first light emitting signal line EM1 are high level signals, so that the first transistor T1, the fifth transistor T5, the sixth transistor T6, and the seventh transistor T7 are turned off. A signal of the second light emitting signal line EM2 is a low level signal so that the twelfth transistor T12 and the thirteenth transistor T13 are turned off. The signal of the second reset signal line Reset2 is a high level signal, so that the fourteenth transistor T14 is turned off. The light emitting device L does not emit light in this stage.

In a fourth stage P4, which is referred to as a light emitting stage, signals of the first light emitting signal line EM1 and the third scan signal line Gate3 are low level signals, signals of the first scan signal line Gate1, the second scan signal line Gate2, the first reset signal line Reset1, the second light emitting signal line EM2, and the second reset signal line Reset2 are high level signals, and a signal of the control signal line SWP is a ramp signal, and a voltage value of the signal is gradually decreased. The signal of the first light emitting signal line EM1 is a low level signal, so that the fifth transistor T5 and the sixth transistor T6 are turned on, and a power supply signal output from a first high level power supply line VDD1 provides a drive signal to the first node N1 through the turned-on fifth transistor T5, the third node N3, the third transistor T3, the fourth node N4, and the sixth transistor T6. At this time, the signal of the first node N1 jumps under an action of the second capacitor C2 and the third capacitor C3, so that a voltage value of the signal of the first node N1 satisfies $V1=Vdata_2+Vth_{10}+\Delta V$, where $\Delta V$ is a jump voltage value, the signal of the second light emitting signal line EM2 is a high level signal, so that the twelfth transistor T12 and the thirteenth transistor T13 are turned on, a power supply signal output from a second high level power supply line VDD2 provides a drive current to the seventh node N7 through the turned-on twelfth transistor T12, the fifth node N5, the tenth transistor T10, the sixth node N6, and the thirteenth transistor T13 to drive the light emitting device L to emit light, a signal of the second reset signal line Reset2 is a high level signal, and the fourteenth transistor T14 is turned off, which does not affect normal light emitting of the light emitting device. Since the voltage value of the signal of the control signal line SWP is gradually decreased, a voltage value of the signal of the second node N2 is also gradually decreased under an action of the first capacitor C1, and a conduction degree of the third transistor T3 is decreased until the third transistor T3 is completely turned off. After the third transistor T3 is completely turned off, the light emitting device L does not emit light.

In a fifth stage P5, which is referred to as a reset stage, signals of the second light emitting signal line EM2 and the second reset signal line Reset2 are low level signals, and signals of the first scan signal line Gate1, the second scan signal line Gate2, the first light emitting signal line EM1, the first reset signal line Reset1, and the third scan signal line Gate3 are high level signals. At this time, the first transistor T1 to the seventh transistor T7 and the ninth transistor T9 to the thirteenth transistor T13 are turned off. The signal of the third scan signal line Gate3 is a high level signal, so that the eighth transistor T8 is turned on, the signal of the second reset signal line Reset2 is a low level signal, so that the fourteenth transistor T14 is turned on, and a signal of the third power supply line VSS is written to the first electrode of the light emitting device L through the turned-on fourteenth transistor T14, so as to reset the first electrode of the light emitting device L and clear the pre-stored voltage in the first electrode of the light emitting device L.

In a drive process of the pixel drive circuit, a drive current flowing through the tenth transistor T10 (second drive transistor) is determined by a voltage difference between the gate electrode and the first electrode of the tenth transistor T10. Since a voltage of the first node N1 is $Vdata2+Vth_{10}+\Delta V$, a voltage value of the signal of the fifth node N5 is V5=Vdd2, where Vdd2 is a voltage value of a signal of the second high level power supply line, so the drive current of the tenth transistor T10 is:

$$I = K*(Vgs - Vth)^2 = K*(Vdata_2 + Vth_{10} + \Delta V - Vdd2 - Vth_{10})^2 = K*(Vdata_2 + \Delta V - Vdd2)^2$$

Where I is the drive current flowing through the tenth transistor T10, that is, a drive current for driving the light emitting device L, K is a constant, and Vgs is the voltage difference between the gate electrode and the first electrode of the tenth transistor T10.

In an exemplary implementation, a picture displayed on the display substrate where the pixel drive circuit is located includes multiple display frames, and a duration of at least one display frame is from 8200 microseconds to 8400 microseconds, and for example may be 8300 microseconds.

In an exemplary implementation, a duration of the first stage in one display frame may be from 2450 microseconds to 2500 microseconds, and for example may be 2470 microseconds.

In an exemplary implementation, a duration of the second stage in one display frame may be from 15 microseconds to 25 microseconds, and for example may be 20 microseconds.

In an exemplary implementation, a duration of the third stage in one display frame may be from 15 microseconds to 25 microseconds, and for example may be 20 microseconds.

In an exemplary implementation, a duration of the fourth stage in one display frame may be from 5750 microseconds to 5800 microseconds, and for example may be 5770 microseconds.

In an exemplary implementation, a duration of the fifth stage in one display frame may be from 15 microseconds to 25 microseconds, and for example may be 20 microseconds.

It can be seen from a derivation result of the above current formula that in the light emitting stage, the drive current of the tenth transistor T10 is not affected by the threshold voltage of the tenth transistor T10. Therefore, influence of the threshold voltage of the tenth transistor T10 on the drive current is eliminated, which can ensure uniformity of the display brightness of the display product, and improve an overall display effect of the display product.

In the present disclosure, by providing the eighth transistor T8, the first node N1 can be quickly charged in the third stage, thus reducing response time of the pixel drive circuit to generate the drive current, and being applicable to high resolution display products. In the present disclosure, all transistors in the duration control sub-circuit are P-type transistors, while the tenth transistor (second drive transistor), the eighth transistor T8, the twelfth transistor T12, and the thirteenth transistor T13 in the current control sub-circuit are N-type transistors, so that a maximum drive current value of the pixel drive circuit can be kept stable regardless of a change of the first data signal, and a drive current maintenance rate is greater than 99.99%. A high drive current maintenance rate means that the pixel drive circuit can easily realize low frequency driving. Therefore, the pixel drive circuit provided by the present disclosure can not only realize high frequency driving, but also realize low frequency driving, which has a wide application range and can also realize accurate driving.

TABLE 1

| Vdata1 (V) | 5.6 | 7.6 | 9.6 | Remark |
|---|---|---|---|---|
| IMax (uA) | 249.992 | 249.991 | 249.992 | 249.995 |
| CHR | 100% | 100%% | 100% | |

Table 1 shows data obtained by simulation test using the pixel drive circuit provided by the present disclosure. IMax is a maximum drive current value, CHR is a drive current maintenance rate, and Vdata1 is a voltage value of the first data signal. As shown in Table 1, voltage values of the first data signal are 5.6 V, 7.6 V, 9.6 V or after initialization, IMax deviation of the pixel drive circuit is not large, and IMax is basically stable at 249.99 uA, and CHR is all 100%.

In an exemplary implementation, response time of the generated drive current of the pixel drive circuit is from 220 microseconds to 270 microseconds and for example may be 250 microseconds.

Figure 10:
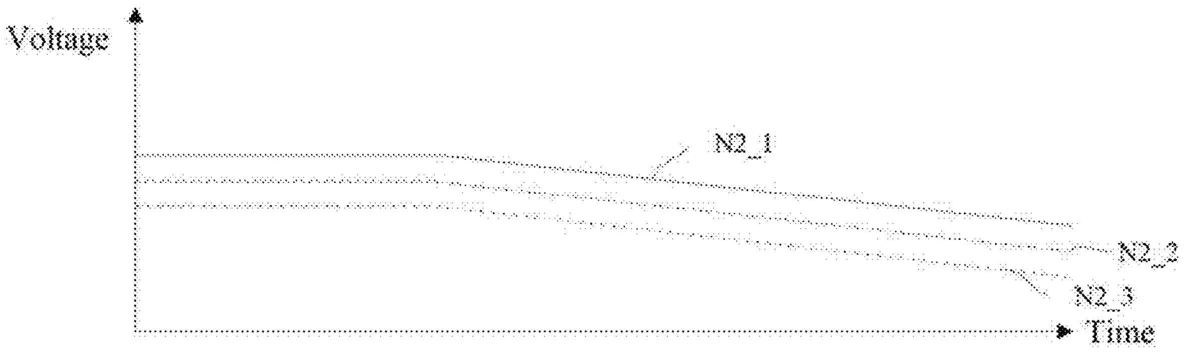
FIG. 10 is a curve of a voltage value of a signal of a second node of a pixel drive circuit varying with time at different voltage values of a first data signal.

FIG. 10 is a curve of a voltage value of a signal of a second node of a pixel drive circuit varying with time at different voltage values of a first data signal. As shown in FIG. 10, N2_1 is the voltage value of the signal of the second node N2 of the pixel drive circuit when the voltage value of the first data signal is 9.6 volts, N2_2 is the voltage value of the signal of the second node N2 of the pixel drive circuit when the voltage value of the first data signal is 7.6 volts, and N2_3 is the voltage value of the signal of the second node N2 of the pixel drive circuit when the voltage value of the first data signal is 5.6 volts. As shown in FIG. 10, the lower the voltage value of the first data signal of the pixel drive circuit, the lower the voltage value of the signal of the second Node N2 of the pixel drive circuit.

Figure 11:
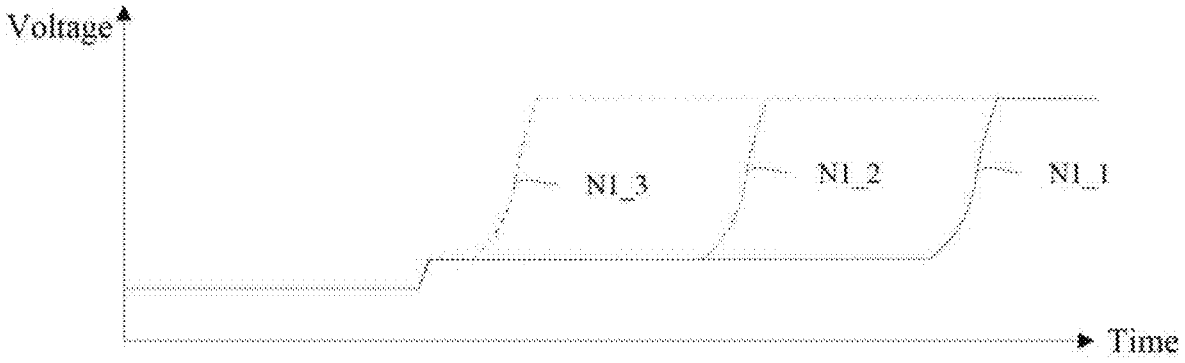
FIG. 11 is a curve of a voltage value of a signal of a first node of a pixel drive circuit varying with time at different voltage values of a first data signal.

FIG. 11 is a curve of a voltage value of a signal of a first node of a pixel drive circuit varying with time at different voltage values of a first data signal. As shown in FIG. 11, N1_1 is the voltage value of the signal of the first node N1 of the pixel drive circuit when the voltage value of the first data signal is 9.6 volts, N1_2 is the voltage value of the signal of the first node N1 of the pixel drive circuit when the voltage value of the first data signal is 7.6 volts, and N1_3 is the voltage value of the signal of the first node N1 of the pixel drive circuit when the voltage value of the first data signal is 5.6 volts. As shown in FIG. 11, the lower the voltage value of the first data signal of the pixel drive circuit, the earlier the voltage value of the signal of the first node N1 of the pixel drive circuit changes.

Figure 12:
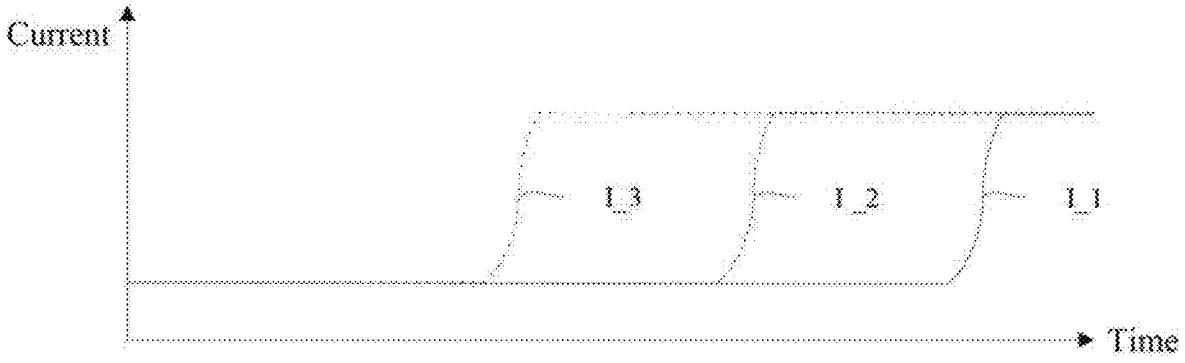
FIG. 12 is a curve of a current value of a drive current generated by a pixel drive circuit varying with time at different voltage values of a first data signal.

FIG. 12 is a curve of a current value of a drive current generated by a pixel drive circuit varying with time at different voltage values of a first data signal. As shown in FIG. 12, I_1 is the current value of the drive current generated by the pixel drive circuit when the voltage value of the first data signal is 9.6 volts, I_2 is the current value of the drive current generated by the pixel drive circuit when the voltage value of the first data signal is 7.6 volts, and I_3 is the current value of the drive current generated by the dynamic current of the pixel drive circuit when the voltage value of the first data signal is 5.6 volts. As shown in FIG. 12, the lower the voltage value of the first data signal of the pixel drive circuit, the earlier the current value of the drive current generated by the pixel drive circuit and the longer the light emitting time of the light emitting device L.

An embodiment of the present disclosure further provides that a display device may include multiple sub-modules, at least one of the sub-modules includes multiple rows of sub-pixels, and at least one of the sub-pixels includes the aforementioned pixel drive circuit and a light emitting device driven by the pixel drive circuit.

The pixel drive circuit is the pixel drive circuit according to any one of the foregoing embodiments, and an implementation principle and implementation effects thereof are similar, which will not be repeated herein.

In an exemplary implementation, the display device may be any device that displays whether it is moving (for example, a video) or fixed (for example, a still image), and whether it is text or image. More specifically, the display device can be one of various electronic devices, can be implemented in or associated with various electronic devices. The various electronic devices include, for example, (but not limited to), a mobile phone, a VR apparatus, an AR apparatus, a wireless device, a Personal Data Assistant (PS1), a handheld or portable computer, a GPS receiver/navigator, a camera, an MP4 video player, a camcorder, a game console, a watch, a clock, a calculator, a TV monitor, a flat panel display, a computer monitor, a car monitor (e.g., an odometer display), a navigator, a cockpit controller and/or display, a camera view display (e.g., a display of a rear-view camera in a car), an electronic photo, an electronic billboards or sign, a projector, building structure, a package, and an aesthetic structure (e.g., an image display for a piece of jewelry). The form of the above-mentioned display device is not limited in the examples of the present disclosure.

Figure 13:
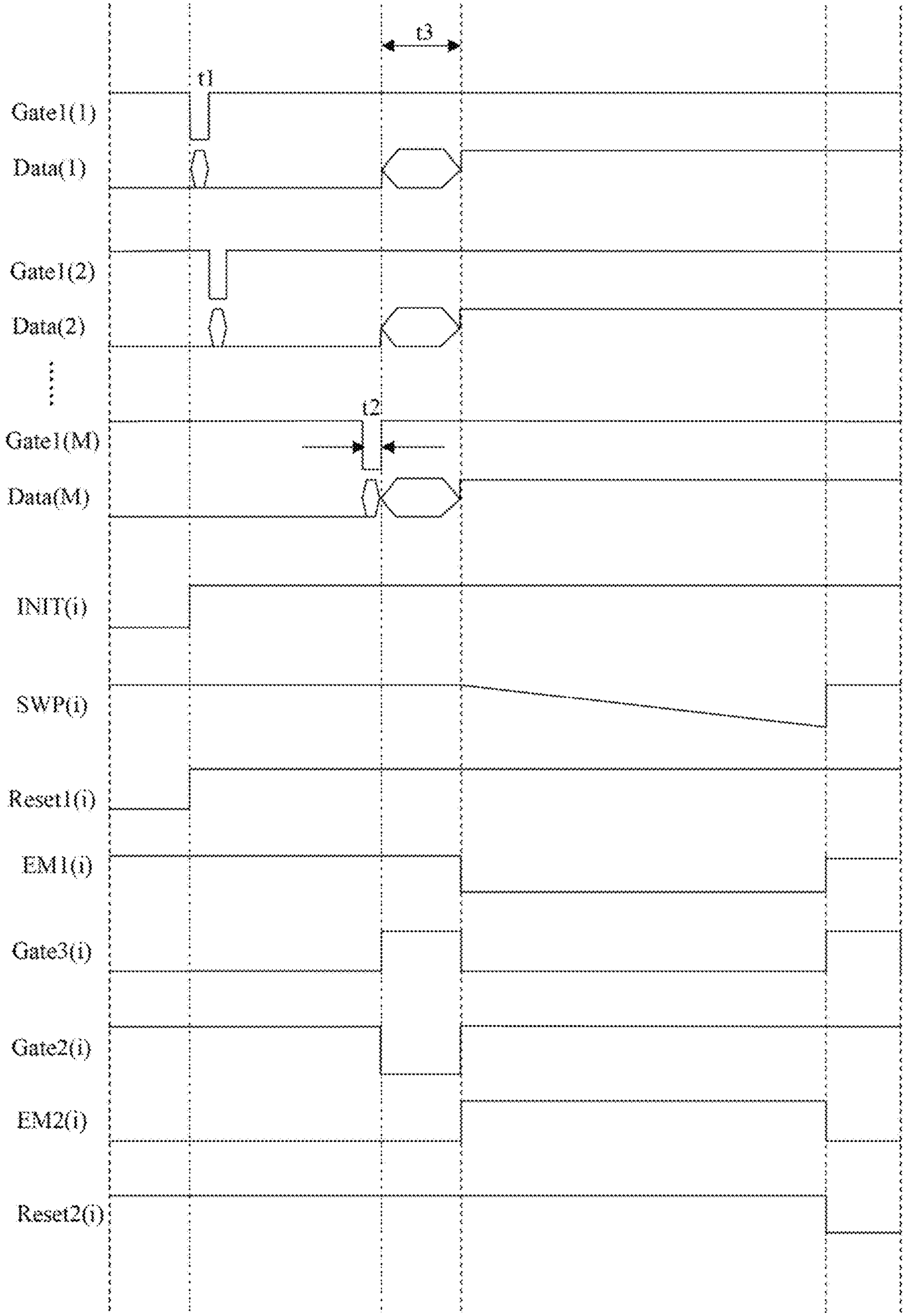
FIG. 13 is a working timing diagram of a sub-module.

In an exemplary implementation, FIG. 13 is a working timing diagram of a sub-module. In FIG. 13, illustration is made by taking a case in which the sub-module includes: M rows of sub-pixels. Where i=1, 2, . . . , M. As shown in FIG. 13, signals of any one of the first reset signal line Reset1, the second reset signal line Reset2, the second scan signal line Gate2, the third scan signal line Gate3, the first light emitting signal line EM1, and the second light emitting signal line EM2 connected to the pixel drive circuits of all the sub-pixels in a same sub-module are identical, that is, the sub-pixels in the same sub-module emit light at the same time.

As shown in FIG. 13, the first time t1 corresponding to the pixel drive circuits of different rows of sub-pixels in the same sub-module are not overlapped, and the first time t1 corresponding to the pixel drive circuit is occurrence time when the signal of the first scan signal line connected to the pixel drive circuit is an effective level signal.

As shown in FIG. 13, the latest occurrence time in the first time corresponding to the pixel drive circuits of all sub-pixels in the same sub-module is second time t2, and occurrence time when the signal of the second scan signal line connected to the pixel drive circuit of any sub-pixel in the same sub-module is the effective level signal is third time t3; the second time t2 is not overlapped with the third time t3 and is earlier than the third time t3.

In an exemplary implementation, a sum of the first time corresponding to the pixel drive circuits of all row sub-pixels located in the same sub-module is a duration of the second stage of any one of the pixel drive circuits.

An embodiment of the present disclosure further provides a method for driving the pixel drive circuit, which is configured to drive the pixel drive circuit. The method for driving the pixel drive circuit may include:

configuring the duration control sub-circuit to provide a control signal to the first node under control of signals of the first scan signal line, the first reset signal line, the first light emitting signal line, the control signal line, the data signal line, the initial signal line, and the first power supply line; and configuring the current control sub-circuit to provide a drive current to the first electrode of the light emitting device under control of signals of the first node, the second scan signal line, the second reset signal line, the second light emitting signal line, the data signal line, and the second power supply line.

The pixel drive circuit is the pixel drive circuit according to any one of the foregoing embodiments, and an implementation principle and implementation effects thereof are similar, which will not be repeated here.

The accompanying drawings of the present disclosure only involve the structures involved in the embodiments of the present disclosure, and other structures may refer to usual designs.

Although the implementations of the present disclosure are disclosed above, the contents are only implementations used for ease of understanding of the present disclosure, but not intended to limit the present disclosure. Any of those skilled in the art of the present disclosure can make any modifications and variations in the implementation mode and details without departing from the spirit and scope of the present disclosure. However, the protection scope of the present disclosure should be subject to the scope defined by the appended claims From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A pixel drive circuit, configured to drive a light emitting device to emit light, the light emitting device comprising: a first electrode and a second electrode, and the pixel drive circuit comprising: a current control sub-circuit and a duration control sub-circuit;

the duration control sub-circuit is electrically connected to a first scan signal line, a first reset signal line, a first light emitting signal line, a control signal line, a data signal line, an initial signal line, a first power supply line, and a first node respectively, and is configured to provide a control signal to the first node under control of signals of the first scan signal line, the first reset signal line, the first light emitting signal line, the control signal line, the data signal line, the initial signal line, and the first power supply line;

the current control sub-circuit is electrically connected to a second scan signal line, a third scan signal line, a second light emitting signal line, the data signal line, a second power supply line, the first node and the first electrode of the light emitting device respectively, and is configured to provide a drive current to the first electrode of the light emitting device under a control of signals of the first node, the second scan signal line, the third scan signal line, the second light emitting signal line, the data signal line, and the second power supply line;

the second electrode of the light emitting device is electrically connected to a third power supply line;

wherein the first scan signal line is used with each horizontal sync period while the second scan signal line and third scan signal line are used with each vertical sync period.

2. The pixel drive circuit according to claim 1, wherein the duration control sub-circuit comprises: a first node control sub-circuit, a first drive sub-circuit, a first output control sub-circuit, and a first storage sub-circuit;

the first node control sub-circuit is electrically connected to the first scan signal line, the first reset signal line, the initial signal line, the data signal line, the first node, a second node, a third node and a fourth node respectively, and is configured to drive a signal of the second node under control of signals of the first scan signal line and the data signal line, and to provide a signal of the initial signal line to the first node and the second node under control of a signal of the first reset signal line;

the first drive sub-circuit is electrically connected to the second node, the third node, and the fourth node respectively, and is configured to provide a drive signal to the fourth node under control of signals of the second node and the third node;

the first output control sub-circuit is electrically connected to the first light emitting signal line, the first node, the third node, the fourth node and the first power supply line respectively, and is configured to provide a signal of the first power supply line to the third node and a signal of the fourth node to the first node under control of a signal of the first light emitting signal line; and the first storage sub-circuit is electrically connected to the second node and the control signal line respectively, and is configured to store a voltage difference between signals of the second node and the control signal line.

3. The pixel drive circuit according to claim 2, wherein the first node control sub-circuit comprises: a first transistor, a second transistor, a fourth transistor, and a seventh transistor, the first drive sub-circuit comprises: a third transistor, and the first output control sub-circuit comprises: a fifth transistor and a sixth transistor;

a control electrode of the first transistor is electrically connected to the first reset signal line, a first electrode of the first transistor is electrically connected to the initial signal line, and a second electrode of the first transistor is electrically connected to the second node;

a control electrode of the second transistor is electrically connected to the first scan signal line, a first electrode of the second transistor is electrically connected to the second node, and a second electrode of the second transistor is electrically connected to the fourth node;

a control electrode of the third transistor is electrically connected to the second node, a first electrode of the third transistor is electrically connected to the third node, and a second electrode of the third transistor is electrically connected to the fourth node;

a control electrode of the fourth transistor is electrically connected to the first scan signal line, a first electrode of the fourth transistor is electrically connected to the data signal line, and a second electrode of the fourth transistor is electrically connected to the third node;

a control electrode of the fifth transistor is electrically connected to the first light emitting signal line, a first electrode of the fifth transistor is electrically connected to the first power supply line, and a second electrode of the fifth transistor is electrically connected to the third node;

a control electrode of the sixth transistor is electrically connected to the first light emitting signal line, a first electrode of the sixth transistor is electrically connected to the fourth node, and a second electrode of the sixth transistor is electrically connected to the first node; and a control electrode of the seventh transistor is electrically connected to the first reset signal line, a first electrode of the seventh transistor is electrically connected to the initial signal line, and a second electrode of the seventh transistor is electrically connected to the first node.

4. The pixel circuit according to claim 2, wherein the first storage sub-circuit comprises: a first capacitor;

a first end of the first capacitor is electrically connected to the control signal line and a second end of the first capacitor is electrically connected to the second node.

5. The pixel drive circuit according to claim 2, wherein the current control sub-circuit comprises: a second node control sub-circuit, a second drive sub-circuit, a second output control sub-circuit, and a second storage sub-circuit;

the second node control sub-circuit is electrically connected to the second scan signal line, the third scan signal line, the data signal line, the first node, a fifth node, and a sixth node respectively, and is configured to drive a signal of the first node under control of signals of the second scan signal line, the third scan signal line, the data signal line, the fifth node and the sixth node;

the second drive sub-circuit is electrically connected to the first node, the fifth node, and the sixth node respectively, and is configured to provide a drive current to the sixth node under control of signals of the first node and the fifth node;

the second output control sub-circuit is electrically connected to the second light emitting signal line, the second power supply line, the fifth node, the sixth node and the first electrode of the light emitting device respectively, and is configured to provide a signal of the second power supply line to the fifth node and provide a drive current to the first electrode of the light emitting device under control of a signal of the second light emitting signal line; and the second storage sub-circuit is electrically connected to the first node, the second power supply line, and the first electrode of the light emitting device respectively, and is configured to store a voltage difference between signals of the first node and the second power supply line and a voltage difference between signals of the first node and the first electrode of the light emitting device.

6. The pixel drive circuit according to claim 1, wherein the current control sub-circuit comprises: a second node control sub-circuit, a second drive sub-circuit, a second output control sub-circuit, and a second storage sub-circuit;

the second node control sub-circuit is electrically connected to the second scan signal line, the third scan signal line, the data signal line, the first node, a fifth node, and a sixth node respectively, and is configured to drive a signal of the first node under control of signals of the second scan signal line, the third scan signal line, the data signal line, the fifth node and the sixth node;

the second drive sub-circuit is electrically connected to the first node, the fifth node, and the sixth node respectively, and is configured to provide a drive current to the sixth node under control of signals of the first node and the fifth node;

the second output control sub-circuit is electrically connected to the second light emitting signal line, the second power supply line, the fifth node, the sixth node and the first electrode of the light emitting device respectively, and is configured to provide a signal of the second power supply line to the fifth node and provide a drive current to the first electrode of the light emitting device under control of a signal of the second light emitting signal line; and the second storage sub-circuit is electrically connected to the first node, the second power supply line, and the first electrode of the light emitting device respectively, and is configured to store a voltage difference between signals of the first node and the second power supply line and a voltage difference between signals of the first node and the first electrode of the light emitting device.

7. The pixel drive circuit according to claim 6, wherein the second node control sub-circuit comprises: an eighth transistor, a ninth transistor, and an eleventh transistor;

a control electrode of the eighth transistor is electrically connected to the third scan signal line, a first electrode of the eighth transistor is electrically connected to the first node, and a second electrode of the eighth transistor is electrically connected to the fifth node;

a control electrode of the ninth transistor is electrically connected to the second scan signal line, a first electrode of the ninth transistor is electrically connected to the first node, and a second electrode of the ninth transistor is electrically connected to the sixth node; and a control electrode of the eleventh transistor is electrically connected to the second scan signal line, a first electrode of the eleventh transistor is electrically connected to the data signal line, and a second electrode of the eleventh transistor is electrically connected to the fifth node.

8. The pixel drive circuit according to claim 6, wherein the second drive sub-circuit comprises: a tenth transistor and the second output control sub-circuit comprises: a twelfth transistor and a thirteenth transistor;

a control electrode of the tenth transistor is electrically connected to the first node, a first electrode of the tenth transistor is electrically connected to the fifth node, and a second electrode of the tenth transistor is electrically connected to the sixth node;

a control electrode of the twelfth transistor is electrically connected to the second light emitting signal line, a first electrode of the twelfth transistor is electrically connected to the second power supply line, and a second electrode of the twelfth transistor is electrically connected to the fifth node; and a control electrode of the thirteenth transistor is electrically connected to the second light emitting signal line, a first electrode of the thirteenth transistor is electrically connected to the sixth node, and a second electrode of the thirteenth transistor is electrically connected to the first electrode of the light emitting device.

9. The pixel drive circuit according to claim 6, wherein the second storage sub-circuit comprises: a second capacitor and a third capacitor;

a first end of the second capacitor is electrically connected to the second power supply line and a second end of the second capacitor is electrically connected to the first node; and a first end of the third capacitor is electrically connected to the first node and a second end of the third capacitor is electrically connected to the first electrode of the light emitting device.

10. The pixel drive circuit according to claim 1, further comprising: a reset sub-circuit;

the reset sub-circuit is electrically connected to a second reset signal line, the first electrode of the light emitting device, and the second electrode of the light emitting device respectively, and is configured to provide a signal of the second electrode of the light emitting device to the first electrode of the light emitting device under control of a signal of the second reset signal line.

11. The pixel drive circuit according to claim 10, wherein the reset sub-circuit comprises: a fourteenth transistor;

a control electrode of the fourteenth transistor is electrically connected to the second reset signal line, a first electrode of the fourteenth transistor is electrically connected to the first electrode of the light emitting device, and a second electrode of the fourteenth transistor is electrically connected to the second electrode of the light emitting device.

12. The pixel drive circuit according to claim 10, wherein when a signal of the first reset signal line is an effective level signal, signals of the first scan signal line, the second scan signal line, the first light emitting signal line, the second light emitting signal line, the third scan signal line, and the second reset signal line are ineffective level signals;

when a signal of the first scan signal line is an effective level signal, signals of the second scan signal line, the first reset signal line, the third scan signal line, the first light emitting signal line, the second light emitting signal line, and the second reset signal line are ineffective level signals;

when a signal of the second scan signal line is an effective level signal, a signal of the third scan signal line is an effective level signal, and signals of the first scan signal line, the first reset signal line, the first light emitting signal line, the second light emitting signal line, and the second reset signal line are ineffective level signals;

a signal of the first light emitting signal line and a signal of the second light emitting signal line are mutually inverted signals, when the signal of the first light emitting signal line is an effective level signal, the signal of the second light emitting signal line is an effective level signal, and signals of the first scan signal line, the second scan signal line, the first reset signal line, the third scan signal line, and the second reset signal line are ineffective level signals; and when the signal of the second reset signal line is an effective level signal, a signal of the third scan signal line is an effective level signal, and signals of the first reset signal line, the first scan signal line, the second scan signal line, the first light emitting signal line, and the second light emitting signal line are ineffective level signals.

13. The pixel drive circuit according to claim 12, wherein when the signal of the first light emitting signal line is an effective level signal, a signal of the control signal line is a ramp signal and a voltage value of the signal of the control signal line is gradually decreased;

occurrence time when the signal of the first scan signal line is an effective level signal is earlier than occurrence time when the signal of the second scan signal line is an effective level signal and a duration for which the signal of the first scan signal line is an effective level signal is less than a duration for which the signal of the second scan signal line is an effective level signal.

14. The pixel drive circuit according to claim 1, further comprising: a reset sub-circuit, the duration control sub-circuit comprising: a first transistor to a seventh transistor and a first capacitor, the current control sub-circuit comprising: an eighth transistor to a thirteenth transistor, a second capacitor and a third capacitor, and the reset sub-circuit comprising: a fourteenth transistor;

a control electrode of the first transistor is electrically connected to the first reset signal line, a first electrode of the first transistor is electrically connected to the initial signal line, and a second electrode of the first transistor is electrically connected to a second node;

a control electrode of the second transistor is electrically connected to the first scan signal line, a first electrode of the second transistor is electrically connected to the second node, and a second electrode of the second transistor is electrically connected to a fourth node;

a control electrode of the third transistor is electrically connected to the second node, a first electrode of the third transistor is electrically connected to a third node, and a second electrode of the third transistor is electrically connected to the fourth node;

a control electrode of the fourth transistor is electrically connected to the first scan signal line, a first electrode of the fourth transistor is electrically connected to the data signal line, and a second electrode of the fourth transistor is electrically connected to the third node;

a control electrode of the fifth transistor is electrically connected to the first light emitting signal line, a first electrode of the fifth transistor is electrically connected to the first power supply line, and a second electrode of the fifth transistor is electrically connected to the third node;

a control electrode of the sixth transistor is electrically connected to the first light emitting signal line, a first electrode of the sixth transistor is electrically connected to the fourth node, and a second electrode of the sixth transistor is electrically connected to the first node;

a control electrode of the seventh transistor is electrically connected to the first reset signal line, a first electrode of the seventh transistor is electrically connected to the initial signal line, and a second electrode of the seventh transistor is electrically connected to the first node;

a control electrode of the eighth transistor is electrically connected to the third scan signal line, a first electrode of the eighth transistor is electrically connected to the first node, and a second electrode of the eighth transistor is electrically connected to a fifth node;

a control electrode of the ninth transistor is electrically connected to the second scan signal line, a first electrode of the ninth transistor is electrically connected to the first node, and a second electrode of the ninth transistor is electrically connected to a sixth node;

a control electrode of the tenth transistor is electrically connected to the first node, a first electrode of the tenth transistor is electrically connected to the fifth node, and a second electrode of the tenth transistor is electrically connected to the sixth node;

a control electrode of the eleventh transistor is electrically connected to the second scan signal line, a first electrode of the eleventh transistor is electrically connected to the data signal line, and a second electrode of the eleventh transistor is electrically connected to the fifth node;

a control electrode of the twelfth transistor is electrically connected to the second light emitting signal line, a first electrode of the twelfth transistor is electrically connected to the second power supply line, and a second electrode of the twelfth transistor is electrically connected to the fifth node;

a control electrode of the thirteenth transistor is electrically connected to the second light emitting signal line, a first electrode of the thirteenth transistor is electrically connected to the sixth node, and a second electrode of the thirteenth transistor is electrically connected to the first electrode of the light emitting device;

a control electrode of the fourteenth transistor is electrically connected to the second reset signal line, a first electrode of the fourteenth transistor is electrically connected to the first electrode of the light emitting device, and a second electrode of the fourteenth transistor is electrically connected to the second electrode of the light emitting device;

a first end of the first capacitor is electrically connected to the control signal line and a second end of the first capacitor is electrically connected to the second node;

a first end of the second capacitor is electrically connected to the second power supply line and a second end of the second capacitor is electrically connected to the first node; and a first end of the third capacitor is electrically connected to the first node and a second end of the third capacitor is electrically connected to the first electrode of the light emitting device.

15. The pixel drive circuit according to claim 14, wherein the third transistor and the eighth transistor are of opposite transistor types, a transistor type of the fifth transistor and the sixth transistor is opposite to a transistor type of the twelfth transistor and the thirteenth transistor, and the eighth transistor and the ninth transistor are of opposite transistor types.

16. The pixel drive circuit according to claim 15, wherein the first transistor to the seventh transistor, the ninth transistor, the eleventh transistor, and the fourteenth transistor are P-type transistors, and the eighth transistor, the tenth transistor, the twelfth transistor, and the thirteenth transistor are N-type transistors.

17. The pixel drive circuit according to claim 14, wherein the first transistor to the seventh transistor, the ninth transistor, the eleventh transistor, and the fourteenth transistor are P-type transistors, and the eighth transistor, the tenth transistor, the twelfth transistor, and the thirteenth transistor are N-type transistors.

18. A display device comprising: a plurality of sub-modules, at least one of the sub-modules comprising: a plurality rows of sub-pixels, at least one of the sub-pixels comprising: the pixel drive circuit according to claim 1 and a light emitting device driven by the pixel drive circuit.

19. The display device according to claim 18, wherein any one of the first reset signal line, the third scan signal line, the second reset signal line, the second scan signal line, the first light emitting signal line, and the second light emitting signal line connected to pixel drive circuits of all sub-pixels in a same sub-module has a same signal;

first time corresponding to pixel drive circuits of different rows of sub-pixels in the same sub-module are not overlapped, and first time corresponding to the pixel drive circuit is an occurrence time when the signal of the first scan signal line connected to the pixel drive circuit is an effective level signal;

latest occurrence time in the first time corresponding to the pixel drive circuits of all sub-pixels in the same sub-module is the second time and occurrence time when the signal of the second scan signal line connected to the pixel drive circuit of any one sub-pixel in the same sub-module is an effective level signal is the third time; and the second time is not overlapped with the third time and is earlier than the third time.

20. A method for driving a pixel drive circuit, configured to drive the pixel drive circuit according to claim 1, the method comprising:

configuring the duration control sub-circuit to provide the control signal to the first node under the control of the signals of the first scan signal line, the first reset signal line, the first light emitting signal line, the control signal line, the data signal line, the initial signal line, and the first power supply line; and configuring the current control sub-circuit to provide the drive current to the first electrode of the light emitting device under the control of the signals of the first node, the second scan signal line, the third scan signal line, the second light emitting signal line, the data signal line, and the second power supply line.

* * * * *